(12) United States Patent
Saine et al.

(10) Patent No.: US 10,807,114 B2
(45) Date of Patent: Oct. 20, 2020

(54) SYSTEM, NOZZLE AND METHOD FOR COATING ELASTIC STRANDS

(71) Applicant: NORDSON CORPORATION, Westlake, OH (US)

(72) Inventors: Joel E. Saine, Dahlonega, GA (US); Charles P. Ganzer, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 91 days.

(21) Appl. No.: 16/186,572

(22) Filed: Nov. 11, 2018

(65) Prior Publication Data

US 2019/0076870 A1   Mar. 14, 2019

Related U.S. Application Data

(60) Continuation of application No. 15/445,773, filed on Feb. 28, 2017, now Pat. No. 10,124,362, which is a
(Continued)

(51) Int. Cl.
   *B05B 15/50* (2018.01)
   *B05D 1/26* (2006.01)
   (Continued)

(52) U.S. Cl.
   CPC ............ *B05B 15/50* (2018.02); *B05B 7/0815* (2013.01); *B05B 15/555* (2018.02); *B05C 5/027* (2013.01);
   (Continued)

(58) Field of Classification Search
   USPC ....................................................... 156/578
   See application file for complete search history.

(56) References Cited

U.S. PATENT DOCUMENTS

| | | | |
|---|---|---|---|
| 3,911,173 A | 10/1975 | Sprague, Jr. | |
| 4,046,576 A | 9/1977 | Terwilliger et al. | |

(Continued)

FOREIGN PATENT DOCUMENTS

| | | |
|---|---|---|
| CN | 103459047 B | 6/2017 |
| EP | 2696991 B1 | 9/2016 |

(Continued)

OTHER PUBLICATIONS

Nordson Corporation, Using Foamed Materials for Bonding and Sealing, Brochure, 2005.

(Continued)

*Primary Examiner* — Sing P Chan
(74) *Attorney, Agent, or Firm* — Baker & Hostetler LLP

(57) ABSTRACT

A contact nozzle for simultaneously coating a plurality of elastic strands moving in a machine direction with an adhesive is described. The contact nozzle includes a single fluid inlet for receiving the adhesive from a fluid module, a first inverted V-shaped notch, a second inverted V-shaped notch, a third inverted V-shaped notch, and a mounting surface configured to abut the fluid module when the contact nozzle is coupled to the fluid module. Each inverted V-shaped notch extends along the contact nozzle in the machine direction, has an open bottom end, a circular closed top end. Each inverted V-shaped notch includes an adhesive orifice in fluid communication with the single fluid inlet for receiving the adhesive for directing the adhesive into contact with an upper surface of an elastic strand.

20 Claims, 20 Drawing Sheets

Related U.S. Application Data division of application No. 14/867,373, filed on Sep. 28, 2015, now Pat. No. 10,046,352, which is a continuation of application No. 13/443,461, filed on Apr. 10, 2012, now Pat. No. 9,168,554.

(60) Provisional application No. 61/474,129, filed on Apr. 11, 2011.

(51) Int. Cl.

| | | |
|---|---|---|
| *B05D 3/04* | (2006.01) | |
| *B29C 65/52* | (2006.01) | |
| *B05B 7/08* | (2006.01) | |
| *B05C 5/02* | (2006.01) | |
| *B05B 15/555* | (2018.01) | |
| *B05D 1/02* | (2006.01) | |
| *B05C 11/06* | (2006.01) | |
| *D06B 3/04* | (2006.01) | |
| *D06B 15/09* | (2006.01) | |
| *B65H 57/04* | (2006.01) | |
| *B29C 65/00* | (2006.01) | |
| *B29L 31/48* | (2006.01) | |

(52) U.S. Cl.
CPC ............. *B05C 5/0241* (2013.01); *B05C 11/06* (2013.01); *B05D 1/02* (2013.01); *B05D 1/265* (2013.01); *B05D 3/042* (2013.01); *B29C 65/525* (2013.01); *B29C 66/7294* (2013.01); *D06B 3/045* (2013.01); *D06B 15/09* (2013.01); *B29K 2913/00* (2013.01); *B29L 2031/4878* (2013.01); *B65H 57/04* (2013.01)

(56) References Cited

U.S. PATENT DOCUMENTS

| | | | |
|---|---|---|---|
| 4,666,542 A | | 5/1987 | De |
| 4,687,477 A | | 8/1987 | Suzuki et al. |
| 4,785,996 A | | 11/1988 | Ziecker et al. |
| 4,815,660 A | | 3/1989 | Boger |
| 4,842,666 A | | 6/1989 | Werenicz |
| 4,917,696 A | | 4/1990 | De |
| 4,995,333 A | | 2/1991 | Keller et al. |
| 5,175,991 A | * | 1/1993 | Stahlecker ............. D01H 1/115 57/328 |
| 5,275,676 A | | 1/1994 | Rooyakkers et al. |
| 5,322,729 A | | 6/1994 | Heeter et al. |
| 5,338,569 A | | 8/1994 | Hatch |
| 5,340,648 A | | 8/1994 | Rollins et al. |
| 5,413,654 A | | 5/1995 | Igaue et al. |
| 5,429,694 A | | 7/1995 | Herrmann |
| 5,501,756 A | | 3/1996 | Rollins et al. |
| 5,505,995 A | | 4/1996 | Leonard |
| 5,507,909 A | | 4/1996 | Rollins et al. |
| 5,525,175 A | | 6/1996 | Blenke et al. |
| 5,576,091 A | | 11/1996 | Zajaczkowski et al. |
| 5,582,668 A | | 12/1996 | Kling |
| 5,688,555 A | | 11/1997 | Teng |
| 5,779,799 A | | 7/1998 | Davis |
| 5,866,210 A | | 2/1999 | Rosynsky et al. |
| 5,916,393 A | | 6/1999 | Shaffer et al. |
| 5,939,136 A | | 8/1999 | Cronk et al. |
| 6,033,513 A | | 3/2000 | Nakamura |
| 6,077,373 A | | 6/2000 | Fletcher et al. |
| 6,077,375 A | | 6/2000 | Kwok |
| D433,692 S | | 11/2000 | Fort et al. |
| 6,235,137 B1 | | 5/2001 | Van et al. |
| 6,248,097 B1 | | 6/2001 | Beitz et al. |
| 6,289,841 B1 | | 9/2001 | Caldwell |
| 6,291,016 B1 | | 9/2001 | Donges et al. |
| 6,361,634 B1 | | 3/2002 | White et al. |
| 6,378,784 B1 | | 4/2002 | Allen et al. |
| 6,383,568 B1 | | 5/2002 | Gast-Bray |
| 6,436,216 B1 | | 8/2002 | Grover |
| 6,509,089 B1 | | 1/2003 | Rollins et al. |
| 6,537,373 B1 | | 3/2003 | Kitano et al. |
| 6,579,382 B2 | | 6/2003 | Ito |
| 6,589,601 B1 | | 7/2003 | Shimada |
| 6,652,693 B2 | | 11/2003 | Burriss et al. |
| 6,676,038 B2 | | 1/2004 | Gressett et al. |
| 6,719,846 B2 | | 4/2004 | Nakamura et al. |
| 6,745,948 B1 | | 6/2004 | Hidaka et al. |
| 6,855,373 B2 | | 2/2005 | Karlsson |
| 6,863,225 B2 | | 3/2005 | Nakamura |
| 6,905,081 B2 | | 6/2005 | Saidman et al. |
| 6,911,232 B2 | | 6/2005 | Crane et al. |
| 6,926,772 B2 | | 8/2005 | Leonard |
| 6,932,802 B2 | | 8/2005 | Luizzi et al. |
| 6,936,125 B2 | | 8/2005 | Harris |
| 7,014,911 B2 | | 3/2006 | Harris |
| D519,536 S | | 4/2006 | De et al. |
| D521,035 S | | 5/2006 | De et al. |
| D529,321 S | | 10/2006 | Gould et al. |
| 7,152,815 B2 | | 12/2006 | Harris et al. |
| D536,354 S | | 2/2007 | Kufner et al. |
| 7,175,108 B2 | | 2/2007 | Saine |
| D550,261 S | | 9/2007 | Bondeson et al. |
| 7,374,792 B2 | | 5/2008 | Rosynsky et al. |
| 7,438,763 B2 | | 10/2008 | Kanke |
| 7,462,240 B2 | | 12/2008 | Harris et al. |
| 7,465,367 B2 | | 12/2008 | Day |
| D588,617 S | | 3/2009 | Burmester et al. |
| 7,521,087 B2 | | 4/2009 | Rosynsky et al. |
| 7,559,487 B2 | | 7/2009 | Gressett et al. |
| 7,578,882 B2 | | 8/2009 | Harris et al. |
| D599,388 S | | 9/2009 | Schreck |
| 7,647,885 B2 | | 1/2010 | Crane et al. |
| 7,703,705 B2 | | 4/2010 | Ganzer |
| 7,754,040 B2 | | 7/2010 | Norrby |
| 7,798,434 B2 | | 9/2010 | Bondeson et al. |
| 7,820,001 B2 | | 10/2010 | Thomas et al. |
| 7,846,281 B2 | | 12/2010 | Muvundamina |
| D641,767 S | | 7/2011 | Juergens |
| D643,054 S | | 8/2011 | Sennrich |
| 8,347,810 B2 | | 1/2013 | Saine et al. |
| 9,168,554 B2 | * | 10/2015 | Saine ................... B05C 5/0241 |
| 10,046,352 B2 | * | 8/2018 | Saine ................... B05D 1/265 |
| 10,124,362 B2 | * | 11/2018 | Saine ................... B05C 5/0241 |
| 2001/0017102 A1 | | 8/2001 | Caldwell |
| 2001/0028920 A1 | | 10/2001 | Ito et al. |
| 2001/0030014 A1 | | 10/2001 | Kwok |
| 2001/0053420 A1 | | 12/2001 | Donges et al. |
| 2001/0054477 A1 | | 12/2001 | Kwok |
| 2002/0036050 A1 | | 3/2002 | Kwok |
| 2003/0089447 A1 | | 5/2003 | Molee et al. |
| 2003/0104130 A1 | | 6/2003 | Karlsson |
| 2003/0161955 A1 | | 8/2003 | Brumwell |
| 2003/0161964 A1 | | 8/2003 | Leonard |
| 2003/0173018 A1 | | 9/2003 | Harris |
| 2003/0173024 A1 | | 9/2003 | Hayder et al. |
| 2003/0224105 A1 | | 12/2003 | Chondroudis et al. |
| 2004/0144494 A1 | | 7/2004 | Harris et al. |
| 2004/0164180 A1 | | 8/2004 | Harris et al. |
| 2005/0013975 A1 | | 1/2005 | Brock et al. |
| 2006/0254698 A1 | | 11/2006 | Tachibana et al. |
| 2006/0258249 A1 | | 11/2006 | Fairbanks et al. |
| 2007/0135008 A1 | | 6/2007 | Hall et al. |
| 2008/0145530 A1 | | 6/2008 | Bondeson et al. |
| 2009/0022890 A1 | | 1/2009 | Takahashi et al. |
| 2009/0206506 A1 | | 8/2009 | Crane et al. |
| 2010/0024987 A1 | | 2/2010 | Saine et al. |
| 2010/0024997 A1 | | 2/2010 | Tigerstrom |
| 2010/0221435 A1 | | 9/2010 | Fork et al. |
| 2010/0221449 A1 | | 9/2010 | Schlatterbeck et al. |
| 2010/0224121 A1 | | 9/2010 | Klingel |
| 2010/0279127 A1 | | 11/2010 | Ukai et al. |
| 2010/0297353 A1 | | 11/2010 | Sahoda et al. |
| 2010/0327074 A1 | | 12/2010 | Bondeson et al. |
| 2011/0012752 A1 | | 1/2011 | Ferrar |
| 2011/0014369 A1 | | 1/2011 | McGuffey |
| 2011/0014430 A1 | | 1/2011 | McGuffey |
| 2011/0114266 A1 | | 5/2011 | Petersen et al. |

(56) References Cited

U.S. PATENT DOCUMENTS

| | | |
|---|---|---|
| 2011/0139066 A1 | 6/2011 | Chuang et al. |
| 2012/0258246 A1* | 10/2012 | Saine .................. B05D 1/265 |
| | | 427/207.1 |
| 2017/0165905 A1* | 6/2017 | Saine .................. B05B 15/555 |
| 2019/0076870 A1* | 3/2019 | Saine .................. B05D 1/265 |
| 2019/0201968 A1* | 7/2019 | Kendall ................ B21F 1/02 |

FOREIGN PATENT DOCUMENTS

| | | |
|---|---|---|
| GB | 1455469 A | 11/1976 |
| JP | 51-037019 Y2 | 9/1976 |
| JP | 52-101838 A | 8/1977 |
| JP | 52-101838 U | 8/1977 |
| JP | 52-150621 U | 11/1977 |
| JP | 52-150621 A | 12/1977 |
| JP | 55-032252 A | 3/1980 |
| JP | 55-032252 Y2 | 8/1980 |
| JP | 08-057394 A | 3/1996 |
| JP | 2001-259497 A | 9/2001 |
| JP | 2003-042393 A | 2/2003 |
| JP | 2003-328275 A | 11/2003 |
| JP | 2004-100113 A | 4/2004 |
| JP | 2004-249191 A | 9/2004 |
| JP | 2004-352494 A | 12/2004 |
| JP | 2006-066366 A | 3/2006 |
| JP | 2008-057394 A | 3/2008 |
| JP | 2009-011890 A | 1/2009 |
| JP | 6385821 B2 | 9/2018 |
| WO | 00/66351 A2 | 11/2000 |
| WO | 2002/098572 A1 | 12/2002 |
| WO | 2011/009913 A1 | 1/2011 |

OTHER PUBLICATIONS

Japanese Application No. 2014-505214: Notification of Reasons of Refusal dated Jun. 23, 2016, 3 pages.
European Patent Office, Written Opinion of the International Preliminary Examining Authority in PCT Application Serial No. PCT/US2012/032893, dated May 7, 2013.
European Patent Office, International Search Report and Written Opinion in PCT Application Serial No. PCT/US2012/032893, dated Aug. 8, 2012.
European Patent Office, International Preliminary Report on Patentability in PCT Application Serial No. PCT/US2012/032893, dated Aug. 9, 2013.
English translation of JP Decision to Grant dated Jan. 16, 2018 for JP Application No. 2014505214.
European Patent Application No. 16188162.8; Office Action 94(3); dated May 16, 2019.
European Patent Office, Communication Pursuant to Article 94(3) EPC in EP Application Serial No. 12716903.5, dated Jun. 12, 2015 (4 pages).

* cited by examiner

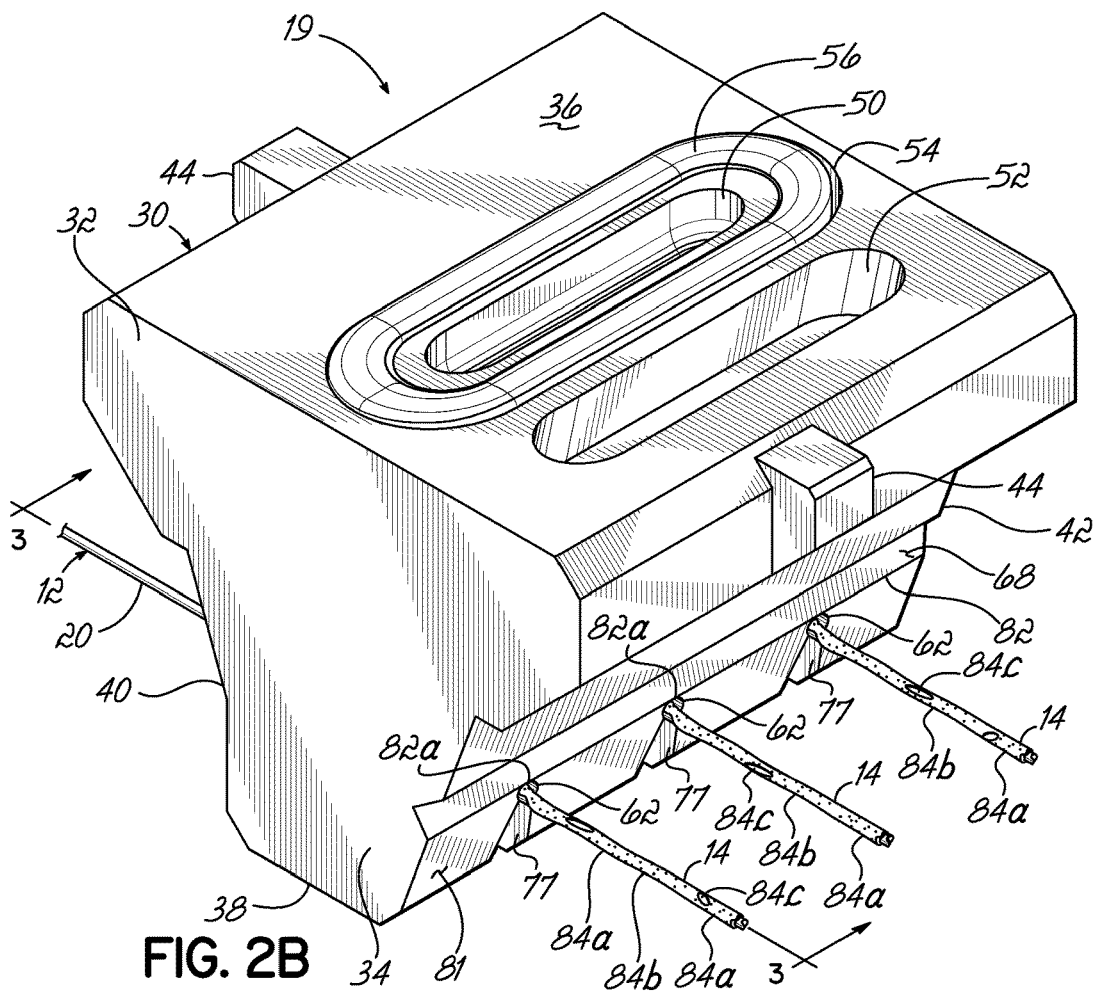
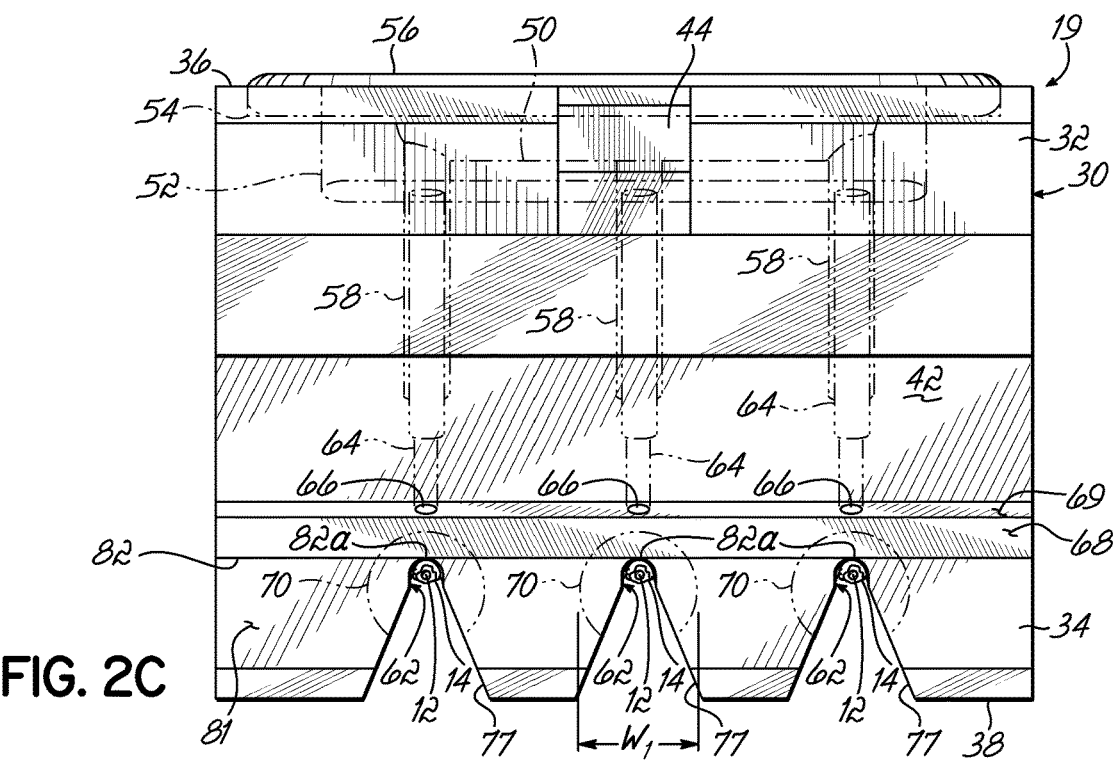

SYSTEM, NOZZLE AND METHOD FOR COATING ELASTIC STRANDS

CROSS-REFERENCE TO RELATED APPLICATIONS

This application is a continuation of U.S. patent application Ser. No. 15/445,773, filed Feb. 28, 2017, and published as U.S. Patent App. Pub. No. 2017/0165905 on Jun. 15, 2017, which is a divisional of U.S. patent application Ser. No. 14/867,373, filed Sep. 28, 2015, and issued as U.S. Pat. No. 10,046,352 on Aug. 14, 2018, which is a continuation of U.S. patent application Ser. No. 13/443,461, filed Apr. 10, 2012, and issued as U.S. Pat. No. 9,168,554 on Oct. 27, 2015, which claims the priority of U.S. Provisional Patent App. No. 61/474,129, filed Apr. 11, 2011, the disclosures of which are incorporated by reference herein.

TECHNICAL FIELD

This invention generally relates to fluid dispensing systems, nozzles, and methods, for applying adhesive onto one or more strands of stretched elastic material.

BACKGROUND

Liquid adhesive, such as temperature and/or pressure sensitive adhesive, is applied onto one or more stretched strands of elastic material or a nonwoven substrate during the manufacture of disposable hygiene products such as diapers, adult incontinence products and feminine hygiene products to form various elastic structure which are part of the hygiene product. For example, in a diaper one or more stretched elastic strands are bonded between the backsheet and top sheet around the leg opening so that the diaper snugly fits around the baby's leg. This is commonly referred to as the leg elastic application. One or more stretched elastic strands are also bonded to different areas of the diaper during the construction of the barrier leg cuff and waist band. Two measurements that are commonly used when evaluating the effectiveness of the bond between the stretched elastic strands and the nonwoven substrates are creep resistance and force retraction. Creep resistance is a measure of how well the ends of the elastic strands remain adhered in position with respect to nonwoven substrates. A high level of creep resistance is desirable because creep will cause a strand to decouple from the nonwoven substrate and contract, thereby removing the elasticity and sealing capabilities of the hygiene product. Force retraction is a measure of how much the adhered elastic strand can retract when the tension on the strand is released. A high level of force retraction is also desirable because a low level of force retraction renders the elasticity of the elastic strand and the hygiene product inadequate for its desired purposes, including product comfort and sealing capability. The adhesive is applied to the one or more stretched elastic strands using a non-contact dispensing system or a contact dispensing system.

In the conventional non-contact dispensing system, the adhesive is dispensed as a continuous filament and moved in a controlled pattern by impacting the filament with air. Different types of nozzles are used in conventional non-contact dispensing systems which result in different controlled patterns for the adhesive filament. In one non-contact dispensing system using a spiral nozzle the adhesive filament is moved back and forth in a helical or spiral pattern while it is in the air prior to contacting the stretched elastic strand. The helical or spiral pattern of the adhesive filament has a component in the direction of motion of the stretched elastic strand and another component transverse to the direction of motion of the stretched elastic strand. CF® nozzles (also identified as Controlled Fiberization™ nozzles) and Sure Wrap® nozzles, available from Nordson Corporation of Westlake, Ohio, are spiral nozzles used to form such a helical pattern with an adhesive filament.

In another non-contact dispensing system using a melt-blowing nozzle, the adhesive filament is moved back and forth in an oscillating pattern such as a sinusoidal or similar pattern while it is in the air prior to contacting the stretched elastic strand. The oscillating pattern of the adhesive filament is in a plane perpendicular to the motion of the stretched elastic strand.

In non-contact dispensing systems using meltblowing nozzles or spiral nozzles, the adhesive filament must be carefully controlled to ensure that the adhesive filament is dispensed onto the narrow elastic strand and to ensure that the adhesive filament sufficiently wraps around the elastic strand. In this regard, the plurality of air jets used to spiral the adhesive filament in Controlled Fiberization™ and Sure Wrap® nozzles are positioned and angled with a high degree of precision to cause movement of the adhesive filament. If one of the air orifices delivering the air jets is blocked by adhesive material or debris during operation, the overall air pattern is disrupted or unbalanced, which leads to an uncontrolled adhesive filament pattern. The uncontrolled adhesive filament pattern causes an undesirable adhesive deposit onto the strand or away from the strand entirely. The adhesive filament in these non-contact dispensing systems must also exhibit a relatively high viscosity to be adequately controllable in flight. The Sure Wrap® nozzle operates using hot melt adhesives with viscosity in the range of 10,000 centipoises to 15,000 centipoises, and the Controlled Fiberization™ nozzle operates using hot melt adhesives with viscosity in the range of 4000 centipoises to 15,000 centipoises.

Yet another type of non-contact dispensing system uses an adhesive nozzle to extrude a bead of adhesive onto a stretched elastic strand that rotates as it passes by the adhesive nozzle without the use of any process air on the bead of adhesive. The stretched elastic strand is rotated about its axis and moved by a nip roller assembly upstream of the adhesive nozzle. As a result, the continuous filament of adhesive is deposited in a generally spiral pattern along the length of the stretched elastic strand. However, this type of non-contact dispensing system may be impractical because it is difficult to predictably rotate or twist the elastic strand at high production line speeds. Despite the above difficulties, non-contact dispensing systems are widely used because the resulting application of adhesive to the stretched elastic strands results in a high level of both creep resistance and force retraction.

One type of contact dispensing system uses a slit coating nozzle including one or more grooves configured to be filled with extruded adhesive. A stretched elastic strand moving through the grooves will be surrounded with the extruded adhesive in the corresponding groove. Consequently, the stretched elastic strand is coated as the strand moves through the grooves in the slit coating nozzle. Slit coating nozzles do not have the filament control difficulties discussed above because the adhesive is not discharged in an airborne filament. Contact dispensing systems using these slit coating nozzles tend to have difficulties adequately coating the bottom surface of the stretched elastic strand. If the bottom surface of the strand is not adequately coated, there is poor bonding between the elastic strand and a nonwoven substrate, which results in a low level of creep resistance. In order to effectively coat the bottom surface of the elastic strand, the flow rate of adhesive into the groove is commonly increased to a substantial extent, which results in a relatively thick coating of adhesive. This thick coating of adhesive effectively bonds the elastic strand to the substrate and improves the creep resistance, but because the strand is so heavily coated, its ability to retract is impeded and results in poor force retraction. The amount of adhesive dispensed to form the thick coating also tends to undesirably drip off the elastic strand onto other equipment, especially when the production line is stopped. However, a contact dispensing system using a slit coating nozzle to apply adhesive to stretched elastic strands is highly repeatable and consistent.

There is a need, therefore, for a contact adhesive dispensing system, nozzle, and method that supplies optimal coating characteristics of adhesive on an elastic strand, including a high level of creep resistance and a high level of force retraction.

SUMMARY

In one embodiment of the invention, a contact nozzle is configured to contact coat at least one stretched elastic strand with an adhesive and then discharge pressurized air towards the adhesive on the strand. For example, a first strand is moving in a machine direction and includes a periphery with an upper surface. The contact nozzle includes a nozzle body having a first slot for receiving the first strand. The contact nozzle also includes a first adhesive passage formed in the nozzle body and terminating at a first adhesive orifice communicating with the first slot. The first adhesive orifice is adapted to be directed at the upper surface of the first strand to deliver the adhesive into contact with the upper surface of the first strand. The contact nozzle also includes a first air passage positioned proximate to the first adhesive passage and terminating at a first air orifice positioned downstream from the first adhesive orifice in the machine direction. The first air orifice is adapted to be directed toward the upper surface of the first strand and is adapted to discharge air at the adhesive in contact with the first strand, thereby causing the adhesive to spread around the periphery of the first strand.

The air discharged from the first air orifice is a pressurized air flow. In addition to spreading the adhesive, this air flow also keeps the nozzle body clear from adhesive build-up which would eventually char and adversely affect the operation of the contact nozzle. Pressurized air flow may be used with any type of contact coating nozzle and process to achieve these benefits. The combination of a contact coating process with the additional air discharge at the adhesive on the strand advantageously provides a strand coated with adhesive along substantially its entire periphery. It is believed that this process causes the thickness of adhesive coating to vary along the length of the strand to maintain elasticity of the strand. To this end, when the coated strand is bonded to one or more nonwoven substrates, such as in diaper construction, the adhesive forms a bond between the substrates and the strand that exhibits desirable levels of creep resistance and force retraction believed to be a result of the thickness irregularities in the adhesive coating. Furthermore, the first strand is coated with the adhesive around the entire periphery without a risk of an adhesive filament, such as in a non-contact dispensing process, being uncontrolled when impacted with process air. Such an uncontrolled filament could lead to adhesive deposit at undetermined or undesirable locations, including off the elastic strand.

In one alternative or additional aspect, the first air passage is formed in the nozzle body. The nozzle body has a rear surface that intersects the first slot at an adhesive release edge. More specifically, the rear surface and the first slot define an interior angle between each other at the adhesive release edge in an upstream direction from the rear surface, the interior angle being an acute angle. Air from the first air orifice is discharged along the rear surface to assist with release of adhesive from the nozzle body at the adhesive release edge. In this regard, the air discharged along the rear surface from the first air orifice is adapted to impact the adhesive on the first strand at an acute angle relative to the machine direction.

In another alternative or additional aspect, the contact nozzle includes a mounting surface on the nozzle body that is adapted to be coupled to a module for supporting the nozzle body. The mounting surface includes an adhesive inlet configured to receive the adhesive from the module. A longitudinal axis defined through the first adhesive orifice and at least a portion of the first adhesive passage intersects the mounting surface at an acute angle. The air discharged from the first air orifice impacts the adhesive on the strand at an acute angle. The acute angle may be in the range of about 50 degrees to about 80 degrees.

In another alternative or additional aspect, the nozzle also includes an air discharge control device operatively coupled to the first air passage. The air discharge control device is operable to intermittently block air flow through the first air passage and the first air orifice. In one example, the air discharge control device causes the air flow to be non-continuous. In another example, the air discharge control device causes the air flow to be pulsed in a periodic manner. The air discharge control device, for example, may be a mechanical device or an air control solenoid valve selectively blocking air flow through the first air passage.

In yet another alternative or additional aspect, the nozzle includes a second slot formed in the nozzle body and spaced from the first slot in a lateral direction transverse to the machine direction. The second slot is configured to receive a second strand moving in the machine direction. The contact nozzle also includes a second adhesive passage formed in the nozzle body and terminating at a second adhesive orifice communicating with the second slot. The second adhesive orifice is adapted to be directed at an upper surface of the second strand to deliver the adhesive into contact with the upper surface of the second strand. The contact nozzle also includes a second air passage terminating at a second air orifice positioned downstream from the second adhesive orifice in the machine direction. The second air passage is adapted to be directed toward the upper surface of the second strand and adapted to discharge air at the adhesive in contact with the second strand to cause the adhesive to spread around a periphery of the second strand. It will be understood that any embodiment of the nozzle may include more than two slots, air passages, and adhesive passages in other embodiments when coating more than two strands. In this regard, any embodiment of the nozzle may include repeated structural elements enabling similar coating of any number of stretched elastic strands.

In another alternative or additional aspect, the nozzle includes another air passage positioned proximate to the first air passage and also directed at the first strand. Therefore, in this embodiment two air passages may be angled with respect to each other so as to cause spreading of the adhesive around opposing sides of the periphery of the first strand. Furthermore, two air passages per strand provide redundancy in case one of the air passages becomes blocked, as either air passage is operable to spread the adhesive around the first strand. For example, in the embodiment described above including first and second air passages for corresponding first and second elastic strands, the contact nozzle may also include a third air passage formed in the nozzle body and adapted to direct air at the first strand, and a fourth air passage formed in the nozzle body and adapted to direct air at the second strand. The two air passages per strand may be staggered along the machine direction such that air from each of these air passages strikes the first strand at different locations along the machine direction. Alternatively, these two air passages may be collinear or aligned with each other in a plane perpendicular to the machine direction such that air from each of these air passages strikes the first strand at about the same location along the machine direction.

In another alternative or additional aspect, the contact nozzle further includes an expansion chamber formed in the nozzle body and communicating with the first adhesive orifice. The expansion chamber is sized to enable die swell of the adhesive exiting the first adhesive orifice. In these embodiments, the contact nozzle also includes a strand guide on the nozzle body. The strand guide is adapted to position the first strand relative to the expansion chamber. As described in further detail below, the expansion chamber or the strand guide may be partially or wholly defined by the first slot in certain embodiments consistent with the current invention. The strand guide may alternatively be separate from and coupled to the nozzle body in some embodiments.

In yet another alternative aspect, the first air passage is located in an air supply line. The air supply line may be coupled to the nozzle body in one embodiment, or in another embodiment, may be separate from the nozzle body and positioned downstream from the nozzle body in the machine direction. Once again, the contact nozzle in this aspect includes a rear surface on the nozzle body intersecting the first slot at an adhesive release edge, the rear surface and the first slot defining an acute angle at the adhesive release edge such that air from the air supply line impacts the adhesive at an acute angle from the machine direction. The acute angle may be in the range of about 50 degrees to about 80 degrees.

In another embodiment of the invention, a contact nozzle for coating at least one elastic strand includes a nozzle body having a first elongate adhesive chamber for receiving the first strand. The first elongate adhesive chamber includes a first chamber surface configured to face the strand. The contact nozzle also includes a first adhesive passage formed in the nozzle body and terminating at a first adhesive orifice in the first chamber surface. The first adhesive orifice is adapted to be directed at the upper surface of the first strand to deliver the adhesive into contact with the upper surface of the first strand. The contact nozzle also includes a first air passage positioned proximate to the first adhesive passage and terminating at a first air orifice positioned downstream from the first adhesive orifice in the machine direction. The first air orifice is adapted to be directed toward the upper surface of the first strand and is adapted to discharge air at the adhesive in contact with the first strand, thereby causing the adhesive to spread around the periphery of the first strand. In addition to spreading the adhesive, this air flow also assists with release of the adhesive from the nozzle body and keeps the nozzle body clear from adhesive build-up which would eventually char and adversely affect the operation of the contact nozzle.

In one aspect, the contact nozzle further includes a strand guide that may be integral with or coupled to the nozzle body, the strand guide being adapted to position the first strand relative to the first elongate adhesive chamber. To this end, the nozzle body may include a rear surface such that the first elongate adhesive chamber extends between the strand guide and the rear surface. In one example, the strand guide is positioned relative to the first elongate adhesive chamber such that a gap between the first chamber surface and the upper surface of the strand remains constant in thickness along the length of the first elongate adhesive chamber. In an alternative example, the strand guide is positioned relative to the first elongate adhesive chamber such that the gap reduces in thickness along the length of the first elongate adhesive chamber. In each of these examples, the gap defines an expansion chamber sized to enable die swell of the adhesive exiting the first adhesive orifice. This die swell causes an initial spreading of the adhesive around the periphery of the strand as the strand moves through the first elongate adhesive chamber.

In yet another embodiment of the invention, a contact nozzle for coating at least one elastic strand includes a nozzle body having a front side, a rear side, and a first V-shaped notch for receiving the first strand. The first V-shaped notch extends between the front and rear sides of the nozzle body. The contact nozzle also includes a first adhesive passage formed in the nozzle body and terminating at a first adhesive orifice communicating with the first V-shaped notch. The first adhesive orifice is adapted to be directed at the upper surface of the first strand to deliver the adhesive into contact with the upper surface of the first strand. The contact nozzle also includes an expansion chamber formed in the nozzle body and communicating with the first adhesive orifice. The expansion chamber is sized to enable die swell of the adhesive exiting the first adhesive orifice. The contact nozzle also includes a first air passage positioned proximate to the first adhesive passage and terminating at a first air orifice positioned downstream from the first adhesive orifice in the machine direction. The first air orifice is adapted to be directed toward the upper surface of the first strand and is adapted to discharge air at the adhesive in contact with the first strand, thereby causing the adhesive to spread around the periphery of the first strand. In addition to spreading the adhesive, this air flow also assists with release of the adhesive from the nozzle body and keeps the nozzle body clear from adhesive build-up which would eventually char and adversely affect the operation of the contact nozzle.

In one aspect, the adhesive is mechanically spread about the periphery of the strand by the V-shaped notch. To this end, the V-shaped notch may include first and second converging surfaces connected at a top edge and defining an angle between the converging surfaces in the range of 60 degrees to 90 degrees. The V-shaped notch extends both upstream and downstream in the machine direction from the expansion chamber. In addition, the V-shaped notch defines a strand guide adapted to position the first strand relative to the expansion chamber.

In another aspect, the contact nozzle includes alignment pins coupled to the front side of the nozzle body and located upstream in the machine direction from the V-shaped notch. The alignment pins are adapted to prevent the first strand from exiting the V-shaped notch during application of adhesive.

In another embodiment of the invention, an adhesive dispensing system for coating at least one elastic strand moving in a machine direction with an adhesive includes a module configured to receive a supply of adhesive. The adhesive dispensing system also includes a contact nozzle coupled to the module. The contact nozzle includes a nozzle body with a first slot for receiving a first strand. The contact nozzle also includes a first adhesive passage formed in the nozzle body and terminating at a first adhesive orifice communicating with the first slot. The first adhesive orifice is adapted to be directed at an upper surface of the first strand to deliver the adhesive into contact with the upper surface of the first strand. The adhesive dispensing system also includes a first air passage positioned proximate to the first adhesive passage and terminating at a first air orifice positioned downstream from the first adhesive orifice in the machine direction. The first air orifice is adapted to be directed toward the upper surface of the first strand and adapted to discharge air at the adhesive in contact with the first strand, causing the adhesive to spread around the periphery of the first strand. In addition to spreading the adhesive, this air flow also assists with release of the adhesive from the nozzle body and keeps the nozzle body clear from adhesive build-up which would eventually char and adversely affect the operation of the contact nozzle.

In one aspect, the first air passage is formed in the nozzle body. The nozzle body may include an expansion chamber communicating with the first adhesive orifice and sized to enable die swell of the adhesive exiting the first adhesive orifice. The contact nozzle may also include a strand guide that is integral with or coupled to the nozzle body for positioning the first strand relative to the expansion chamber. In one embodiment, the first slot includes an elongate adhesive chamber adapted to receive the first strand. The elongate adhesive chamber extends from the strand guide to a rear surface of the nozzle body and includes a first chamber surface including the adhesive orifice. The first chamber surface is spaced from the strand so as to define a gap that defines an expansion chamber sized to enable die swell of the adhesive as the adhesive moves through the elongate adhesive chamber. In another embodiment, the first slot includes a V-shaped notch that defines the strand guide extending between front and rear sides of the nozzle body. The V-shaped notch is defined by two converging surfaces that are connected at a top edge which intersects the expansion chamber.

In yet another embodiment of the invention, a method of contact coating at least one elastic strand with an adhesive includes moving a first strand in a machine direction relative to a contact nozzle. The method also includes discharging the adhesive from the contact nozzle onto an upper surface of the first strand. Pressurized air is then discharged at the adhesive on the first strand, causing the adhesive to spread around the periphery of the strand. The pressurized air also assists with release of adhesive from the contact nozzle and keeps the nozzle body clear from adhesive build-up.

In one alternative or additional aspect, the air is discharged from an air orifice in the contact nozzle. The air is also discharged at an acute angle relative to the machine direction as measured between the direction of air discharge and the first strand upstream of the air in the machine direction. For example, the acute angle from the machine direction may be in the range of about 50 degrees to about 80 degrees. Thus, the air intersects the first strand at the acute angle. A smaller acute angle may be chosen to make the air flow more parallel to the strand movement, thereby enabling higher air pressures to be used such as during start-up of the adhesive dispensing system.

In another alternative or additional aspect, multiple streams of air are discharged toward the adhesive on the strand to cause the adhesive to spread around opposing sides of the periphery of the strand. The multiple streams of air may be staggered in the machine direction such that the multiple streams of air strike the strand at different locations along the machine direction. Alternatively, the multiple streams of air are aligned in a plane perpendicular to the machine direction such that the multiple streams of air strike the strand at about the same location along the machine direction.

In another alternative or additional aspect, the pressurized air is discharged continuously at the adhesive in contact with the first strand, causing substantially continuous spreading of the adhesive around the first strand. Alternatively, the pressurized air is discharged non-continuously at the adhesive in contact with the first strand, causing substantially non-continuous spreading of the adhesive around the first strand. In one example, this non-continuous spreading may be caused by periodic pulsing of the pressurized air. Regardless of the method of discharging air, the adhesive is spread around the periphery of the first strand such that the adhesive defines thickness irregularities along the length of the first strand.

In one aspect, the method includes moving the first strand through an elongate adhesive chamber in communication with the first adhesive orifice and spreading the adhesive in contact with the upper surface of the first strand. The first strand may be moved through the elongate adhesive chamber so as to be generally parallel to a chamber surface including the first adhesive orifice. Alternatively, the first strand may be moved through the elongate adhesive chamber so as to move closer to the chamber surface along the length of the elongate adhesive chamber. In another aspect, the method includes moving the first strand through a V-shaped notch formed on the contact nozzle. The V-shaped notch mechanically moves the adhesive on the strand to spread the adhesive about the periphery of the strand.

The various features of the embodiments described above may be combined in any configuration as desired. For example, all embodiments of the nozzle are capable of coating more than one stretched elastic strand by duplicating the structural elements used to coat the first stretched elastic strand. Various additional features and advantages of the invention will become more apparent upon review of the following detailed description of the illustrative embodiments taken in conjunction with the accompanying drawings.

BRIEF DESCRIPTION OF THE DRAWINGS

FIG. 2B is a rear side perspective view of the nozzle of FIG. 2A.

FIG. 2C is a rear side view of the nozzle of FIG. 2A, showing multiple air passages in phantom.

DETAILED DESCRIPTION

Figure 1:
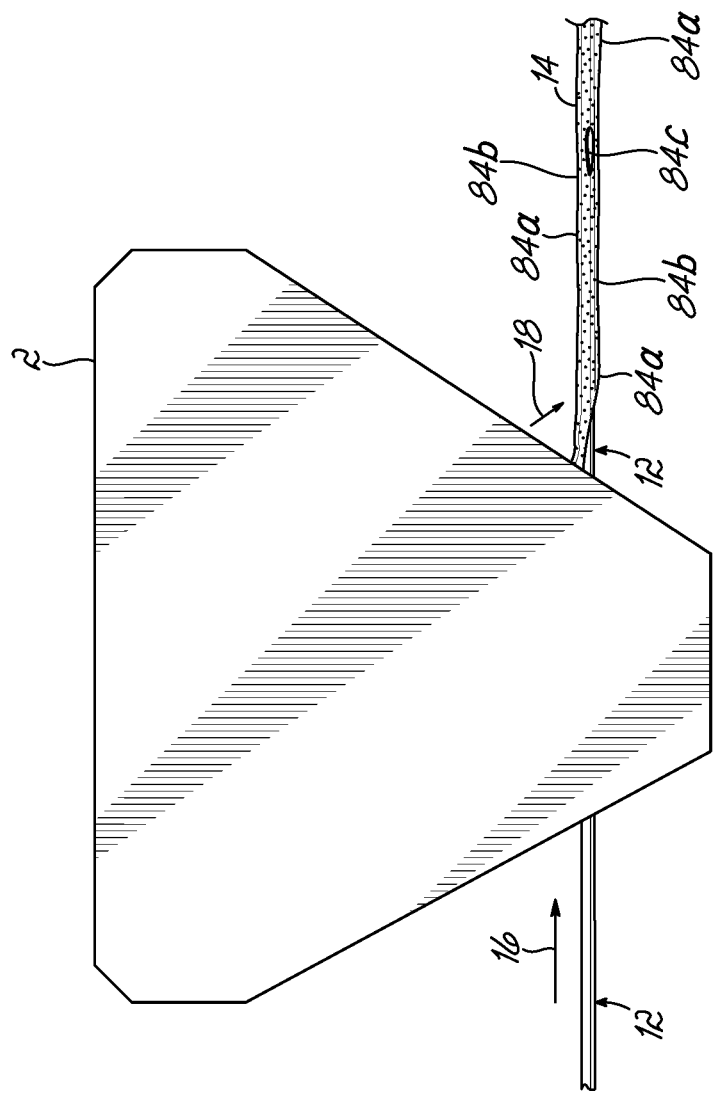
FIG. 1 is a schematic side view of one embodiment of a contact nozzle for use with an adhesive dispensing system according to the current invention.

FIG. 1 illustrates a contact nozzle 2 configured for use in an adhesive dispensing system according to the present invention. The contact nozzle 2 receives a stretched elastic strand 12 and applies an adhesive 14 to the elastic strand 12 by contact coating the elastic strand 12 as the elastic strand 12 moves in a machine direction as indicated by arrow 16. The contact nozzle 2 is illustrated in this figure as a generalized contact nozzle 2, and it will be appreciated that a contact nozzle having any form and any particular shape may be used in accordance with the principles of the current invention. Pressurized air (hereinafter "air") is then discharged at the adhesive 14 on the elastic strand 12 as shown by arrow 18 downstream (relative to the machine direction 16) from the application of the adhesive 14. Although the air flow is represented by an arrow 18 originating at the contact nozzle 2 in FIG. 1, it will be understood that the air may be discharged from a separate air supply line or by some other method unrelated to the contact nozzle 2 in other embodiments within the scope of the current invention. The air flow further moves or spreads the adhesive 14 around the strand 12, thereby resulting in different thicknesses of adhesive coating along the length of the strand 12. The air flow also assists the adhesive in releasing from the contact nozzle 2 and keeps the contact nozzle 2 clear from adhesive build-up which would eventually char and adversely affect the operation of the contact nozzle 2. The air is a pressurized air flow such that the effects of impacting the air and the adhesive 14 on the strand 12 are in addition to any effects ambient environmental air may have on the adhesive 14 as the elastic strand 12 moves in the machine direction 16. The combination of a contact coating process with the additional air discharge at the adhesive 14 on the strand 12 advantageously provides a strand 12 reliably coated with adhesive 14 along substantially its entire periphery. It is believed that this process causes the thickness of adhesive coating to vary along the length of the strand 12 to maintain elasticity of the strand 12. In this regard, the adhesive 14 forms a coating with a plurality of thicker portions 84a, a plurality of thinner portions 84b, and preferably a plurality of void portions 84c where no adhesive 14 is on the strand 12. When the coated strand is bonded to one or more nonwoven substrates, such as in diaper construction, the adhesive forms a bond between the substrates and the strand that exhibits desirable levels of creep resistance and force retraction.

FIGS. 2A-15D illustrate several embodiments of the adhesive dispensing system 10, 310, 410, 510 according to the present invention including a module 15 coupled with a contact nozzle 19, 110, 312, 412, 512. The module 15 may be a Universal™ module obtained from Nordson Corporation of Westlake, Ohio. The Universal™ module is further described in U.S. Pat. No. 6,676,038 to Gressett Jr. et al. and U.S. Pat. No. 7,559,487 to Gressett Jr. et al., the disclosures of which are hereby incorporated by reference herein. In each of these exemplary embodiments and consistent with the generalized embodiment shown in FIG. 1, the contact nozzle applies an adhesive to an elastic strand by dispensing adhesive from an orifice and contact coating the strand with the adhesive adjacent to the orifice. After the adhesive has been contacted with the elastic strand, air is discharged toward the adhesive on the strand. The operation of each embodiment is described in further detail below.

Figure 2A:
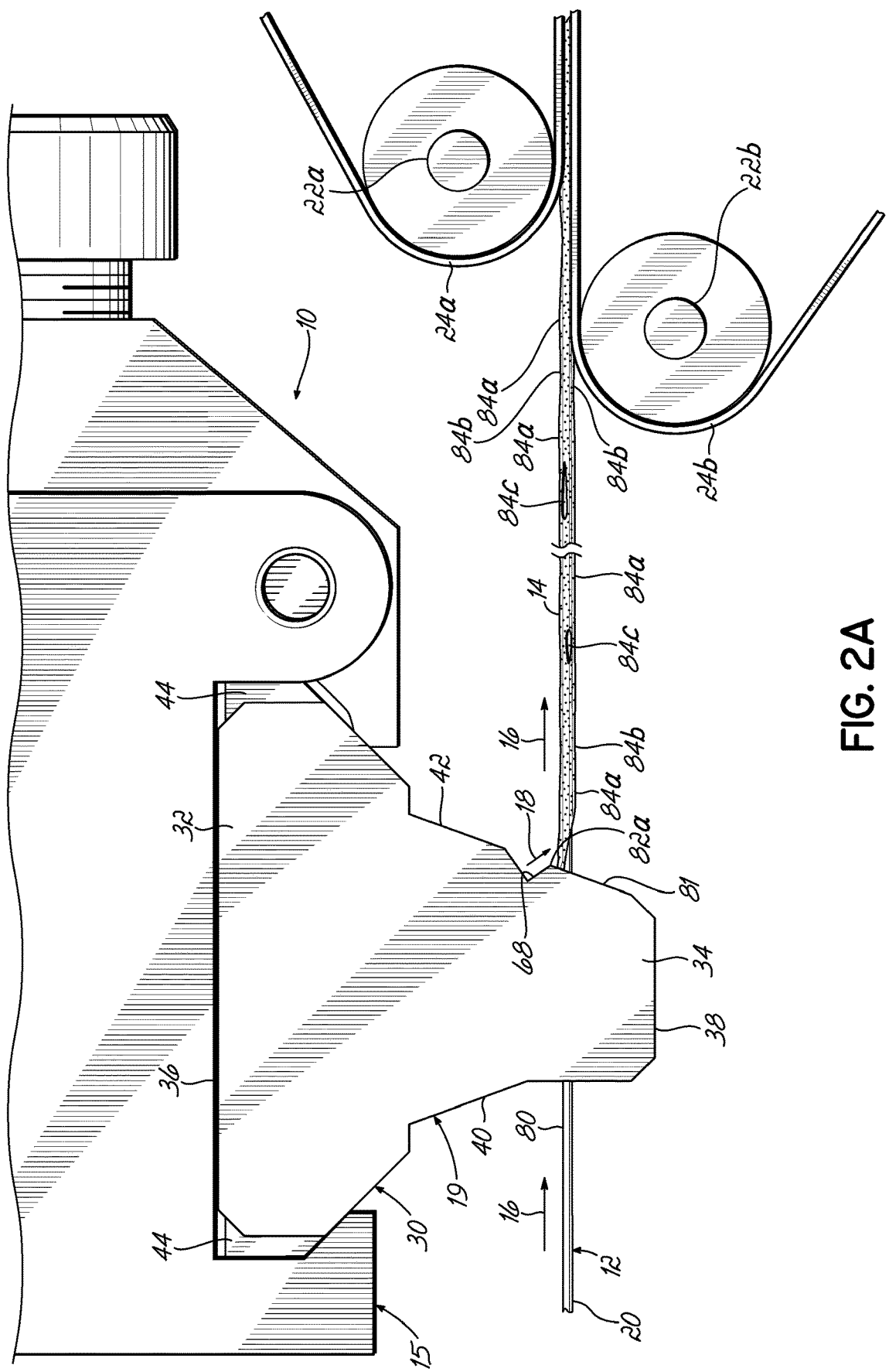
FIG. 2A is a schematic side view of another embodiment of an adhesive dispensing system in a nonwoven assembly process.

FIGS. 2A-4 further illustrate one embodiment of an adhesive dispensing system 10 including a contact nozzle 19 for coating a strand 12 with an adhesive 14. More particularly, the nozzle 19 is coating one or more stretched elastic strands 12 with a hot melt adhesive 14 so as to form an elasticized portion of a hygiene product such as a diaper or sanitary napkin. The nozzle 19 applies hot melt adhesive 14 onto the elastic strand 12 as the elastic strand 12 moves in a machine direction through a slot (not shown in FIG. 2A) as indicated by arrows 16. The nozzle 19 then discharges pressurized air at the hot melt adhesive 14 as shown by arrows 18 to cause the hot melt adhesive 14 to spread around a periphery 20 of the elastic strand 12. The nozzle 19 uses hot melt adhesive 14 of a generally low viscosity because the air is discharged at the hot melt adhesive 14 only when the hot melt adhesive 14 is in contact with the strand 12. Since the hot melt adhesive 14 is not dispensed into the air as a filament and impacted with process air to move in a controlled pattern, there is no risk of uncontrolled filaments and no need for high viscosity to maintain filament integrity. The elastic strand 12 then continues in the machine direction to first and second bonding reels 22a, 22b that couple first and second nonwoven substrates 24a, 24b such as top and bottom sheets of a typical diaper to the elastic strand 12 in a sandwich-like construction. The hot melt adhesive thus bonds the nonwoven substrates 24a, 24b and the elastic strand 12 to form an elasticized portion of a hygiene product. Although FIG. 2A illustrates the first and second nonwoven substrates 24a, 24b are two different sheets of material, the sandwich-like construction could alternatively be formed by one sheet of nonwoven material folded onto itself around the elastic strand 12 to form two substrate layers. Furthermore, the first bonding reel 22a and second bonding reel 22b may be staggered or aligned in the machine direction.

It will be understood that the use of directional terms such as upper, top, bottom, front, rear, and lateral in the following description is for illustrative purposes only and does not limit the structure or methods to any such orientation. Furthermore, the shape and size of various components of the nozzle 19 described below may be modified in accordance with the needs of the user without departing from the scope of the invention.

The nozzle 19 is shown in further detail in FIGS. 2B through 3D. The nozzle 19 includes a nozzle body 30 including an upper body portion 32 and a lower body portion 34. The nozzle body 30 also includes a top side 36, a bottom side 38, a front side 40 extending between the top and bottom sides 36, 38, and a rear side 42 extending between the top and bottom sides 36, 38. The top side 36 defines a mounting surface configured to abut the module 15. The upper body portion 32 is generally longer along the machine direction than the lower body portion 34 from the front side 40 to the rear side 42, thereby giving the nozzle 19 a tapered appearance from the top side 36 to the bottom side 38. Thus, the upper body portion 32 defines connection portions 44 along the front side 40 and the rear side 42 for aligning the nozzle 19 with the module 15. The nozzle 19 is clamped to the module 15 such that the top side 36 (i.e., the mounting surface) is coupled to the module 15 as well understood from U.S. Pat. Nos. 6,676,038 and 7,559,487. In some embodiments, the nozzle body 30 may have a different shape and size, including but not limited to being formed by stacked plates.

The nozzle 19 further includes an adhesive inlet 50 and an air inlet 52 disposed along the mounting surface at the top side 36 of the nozzle body 30. The adhesive inlet 50 is surrounded by a seal groove 54 that receives a seal member 56 between the nozzle 19 and the previously-described module 15. The adhesive inlet 50 is fluidically coupled to a plurality of adhesive passages 58 formed in the nozzle body 30 and extending into the lower body portion 34 of the nozzle body 30. Although three adhesive passages 58 are shown in FIG. 2C, more or fewer adhesive passages 58 may be coupled to the adhesive inlet 50 in other embodiments of the nozzle 19. Each adhesive passage 58 is spaced from adjacent adhesive passages 58 in a lateral direction transverse to the machine direction. Each adhesive passage 58 delivers adhesive 14 from the adhesive inlet 50 to an adhesive orifice 60 communicating with a respective slot 62 formed near the bottom side 38 of the nozzle body 30. The slot 62 of this embodiment includes an elongate adhesive chamber 62 as described in further detail with reference to FIGS. 3A and 3B below.

Figure 2D:
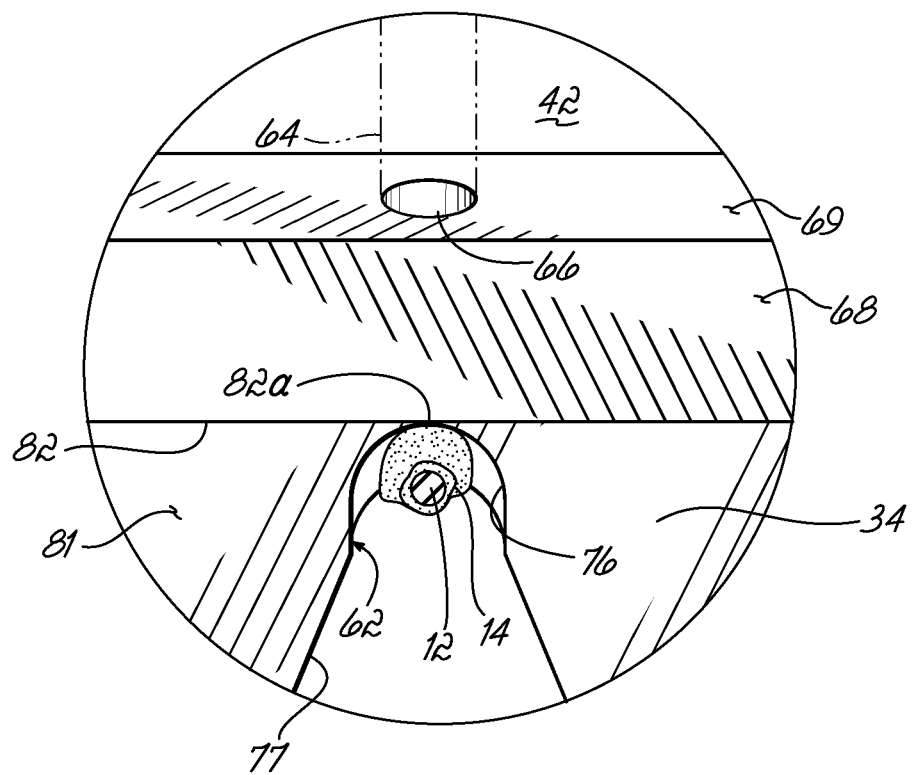
FIG. 2D is a detailed rear side view of the nozzle of FIG. 2A, showing the adhesive chamber and access slot.
Figure 3A:
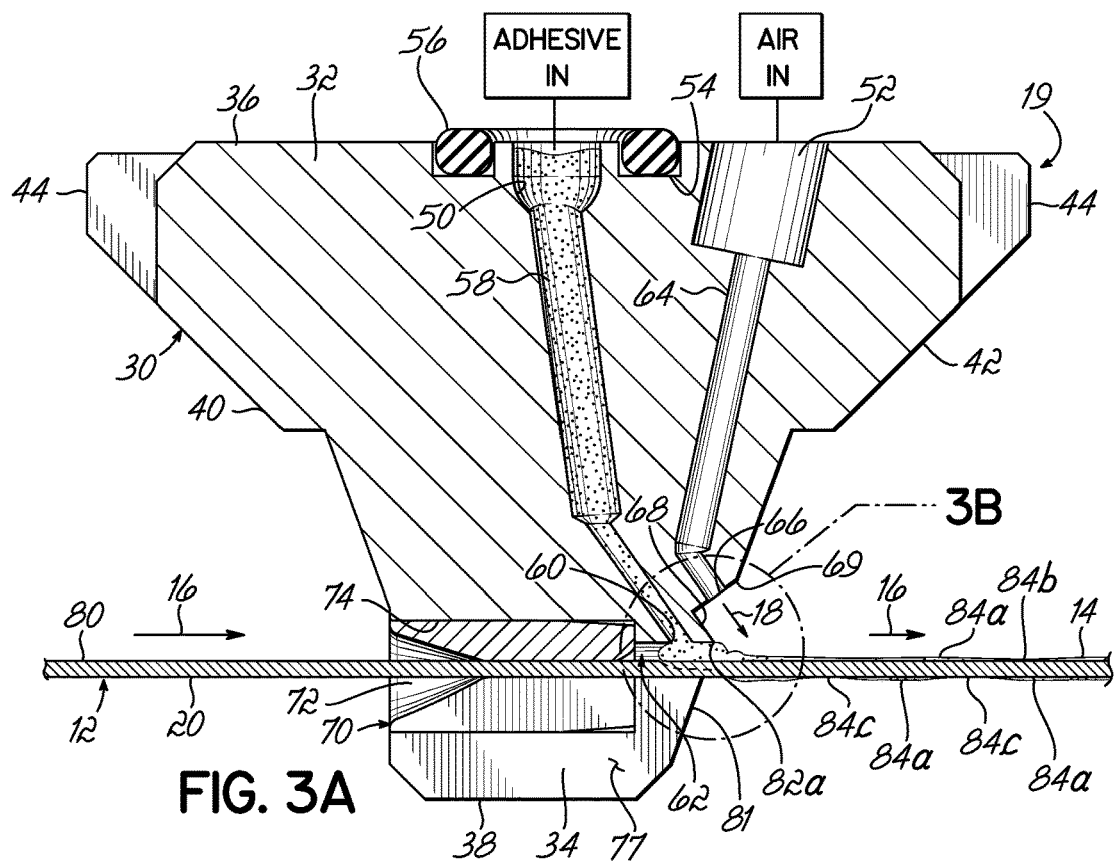
FIG. 3A is a side cross-sectional view of the nozzle of FIG. 2B along line 3-3, illustrating internal flow passages for adhesive and air.
Figure 3B:
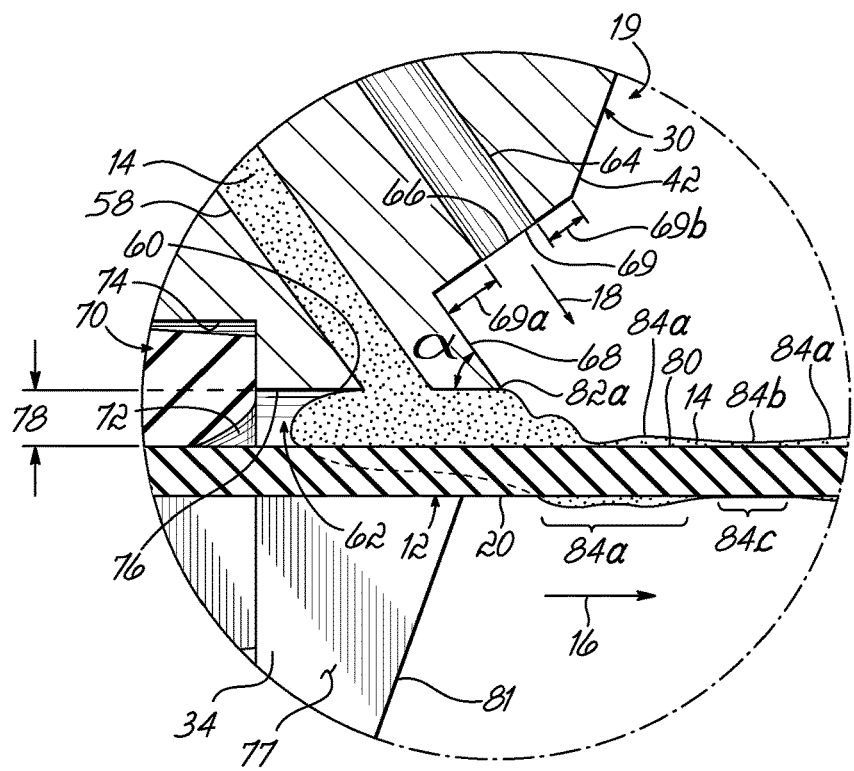
FIG. 3B is a detailed side cross-sectional view of the nozzle of FIG. 3A, further illustrating the adhesive release edge of the nozzle body.

In a similar manner, the air inlet 52 is fluidically coupled to a plurality of air passages 64 formed in the nozzle body 30 and extending into the lower body portion 34. Each air passage 64 is positioned proximate to and directly rearward of the respective adhesive passage 58 within the nozzle body 30. In this regard, each set of adhesive passages 58 and air passages 64 coats one strand 12 passing through the nozzle 19. Furthermore, each set of adhesive passages 58 and air passages 64 in the illustrated embodiment includes only one adhesive passage 58 and only one air passage 64 for the corresponding strand 12. As shown in FIGS. 3A and 3B, it will be understood that at least a lower portion of the adhesive passage 58 and the air passage 64 are manufactured so as to be generally parallel to one another, thereby avoiding interferences between the passages 58, 64 within the nozzle body 30. In addition, it will be understood that the adhesive passage 58 may be machined to include a slight bend at one point between the adhesive inlet 50 and the adhesive orifice 60 as shown in FIG. 3A or may be machined to follow a linear path between the adhesive inlet 50 and the adhesive orifice 60 in other embodiments (for example, FIG. 15A) without departing from the scope of the current invention. Each air passage 64 is spaced from adjacent air passages 64 in the lateral direction. Each air passage 64 delivers air from the air inlet 52 to an air orifice 66 directed at the adhesive 14 in contact with the strand 12. More particularly, the air orifice 66 is positioned adjacent to a rear surface 68, which is part of the rear side 42 of the nozzle body 30. As such, air discharged from the air passage 64 and the air orifice 66 is directed along the rear surface 68 to act on the adhesive 14 as the strand 12 exits the adhesive chamber 62. As shown in FIGS. 2D and 3B, the air orifice 66 is located in an intermediate surface 69 extending from the rear surface 68. The thicknesses 69a and 69b of the intermediate surface 69 on opposite sides of the air orifice 66 are minimized so as to reduce any eddy currents that tend to form adjacent oblique surfaces surrounding the air orifice 66. The reduction of eddy currents along the intermediate surface 69 makes the delivery of air toward the strand 12 more laminar.

The nozzle 19 further includes one or more strand guides 70 positioned proximate to the nozzle body 30 for guiding the respective strands 12 into the corresponding adhesive chambers 62. Strand guides used with spiral nozzles are further described in U.S. Pat. No. 7,647,885 to Crane et al. and U.S. Patent Publication No. 2010/0024997 to Saine et al., which are assigned to Nordson Corporation and the disclosures of which are hereby incorporated by reference herein. In the illustrated embodiment, each strand guide 70 is coupled to the nozzle body 30 and includes a guide slot 72 in communication with the corresponding adhesive chamber 62. The guide slot 72 tapers inwardly in the machine direction so that the strand 12 is accurately positioned in the adhesive chamber 62 to travel underneath the adhesive orifice 60 and the air orifice 66. Each strand guide 70 also defines a lateral width $W_1$ as shown in FIG. 2C. Thus, the adjacent sets of adhesive passages 58 and air passages 64 in the nozzle body 30 are spaced laterally from one another by any distance above a minimum spacing defined by the lateral width $W_1$ of the strand guides 70. In this regard, the provision of only one air passage 64 and only one adhesive passage 58 per strand 12 requires less width in the nozzle body 30 than the lateral width $W_1$ of the strand guides 70. For at least this reason, the minimum spacing between multiple strands 12 running through the nozzle 19 is dependent upon the strand guides 70 rather than the adhesive passage 58 and air passage 64.

In one example, each strand guide 70 is separately formed and inserted into a corresponding guide cavity 74 in the nozzle body 30 as shown in the figures. In this arrangement, the strand guides 70 are replaceable if the moving strand 12 wears out the guide slot 72. Furthermore, the strand guides 70 in this arrangement are formed from stainless steel with a Titanium Nitride coating for resisting frictional wear, while the nozzle body 30 is machined from a different material such as aluminum or brass. The strand guides 70 can include only the guide slot 72 as shown or can be modified to include the guide slot 72 and the adhesive chamber 62 in another non-illustrated embodiment. To this end, the strand guide 70 of the illustrated embodiment is formed separately and located upstream from the adhesive chamber 62. In other embodiments, the strand guides 70 are formed integrally with the nozzle body 30. In this arrangement, the nozzle body 30 may be machined from steel and a Titanium Nitride coating may be used in the area of the integral strand guide 70 to resist frictional wear. In still another arrangement, the strand guides 70 are coupled to the nozzle body 30 or coupled to another structure adjacent the nozzle body 30 such as a module that carries the nozzle 19.

FIGS. 2D, 3A, and 3B further illustrate one of the elongate adhesive chambers 62 (e.g., the slots 62) in greater detail. The adhesive chamber 62 includes a chamber surface 76 on the nozzle body 30, the chamber surface 76 including the adhesive orifice 60 communicating with the adhesive passage 58. The nozzle body 30 further includes an access slot 77 extending downwardly from the adhesive chamber 62 to the bottom side 38 as shown in FIG. 2D. The access slot 77 communicates with the adhesive chamber 62 and the guide slot 72 in the strand guide 70 so that the elastic strand 12 may be inserted upwardly through the access slot 77 into the guide slot 72 and the adhesive chamber 62 rather than being threaded through those elements. The adhesive chamber 62 is shown as a slot in FIGS. 3A and 3B, but it will be understood that the adhesive chamber 62 may define different shapes and sizes in other embodiments, including being tapered. In embodiments with a tapered adhesive chamber 62, the taper is continuous or stepped. Furthermore, while the adhesive chamber 62 and the access slot 77 are milled into the nozzle body 30 in the illustrated embodiment, alternative embodiments of the nozzle 19 may include an adhesive chamber 62 formed by one or more apertures drilled through the nozzle body 30 along the machine direction. An access slot 77 may then be milled between the drilled apertures and the bottom side 38 of the nozzle body 30. In one example, an adhesive chamber 62 including two drilled apertures defines a figure-8 cross-sectional shape, and the access slot 77 may be milled into the intersection of the two drilled apertures.

Thus, the adhesive chamber 62 is in fluid communication with the adhesive passage 58 through the adhesive orifice 60. The guide slot 72 of the strand guide 70 positions the strand 12 within the adhesive chamber 62 so as to define a gap 78 between the chamber surface 76 and an upper surface 80 of the strand 12. The gap 78 defines an expansion chamber that is sized to permit an initial expansion of adhesive 14 into the adhesive chamber 62 above the strand 12 due to the effects of die swell within the adhesive chamber 62. In the exemplary embodiment shown, the gap 78 is sized within the range of about 0.005 inches to about 0.015 inches. As well understood in the art, die swell refers to the phenomenon of a stream of material swelling in volume after being compressed in a narrow die or passage (such as the adhesive passage 58). The adhesive chamber 62 is substantially filled with adhesive 14 at the gap 78 such that the adhesive 14 is applied to the elastic strand 12 as the strand 12 moves through the adhesive chamber 62. Thus, the adhesive chamber 62 is configured to encourage initial expansion and spreading of the adhesive 14 in this embodiment. Because the elastic strand 12 passes through the adhesive chamber 62 at a greater velocity than the adhesive 14 is supplied to the adhesive chamber 62, the strand 12 draws the adhesive 14 from the adhesive chamber 62 in a manner that ensures that the strand 12 is not coated with unnecessary or excess adhesive 14. Additionally, the gap 78 between the chamber surface 76 and the upper surface 80 of the strand 12 in combination with the effects of die swell causes the adhesive 14 to begin spreading around the periphery 20 of the strand 12 as the strand 12 passes through the adhesive chamber 62 as indicated in phantom in FIG. 3B.

As shown in FIG. 2D, the rear surface 68 of the nozzle body 30 also intersects a lower rear surface 81 at an elongate edge 82. The adhesive chamber 62 and the access slot 77 terminate at the lower rear surface 81. The elongate edge 82 includes an adhesive release edge 82a where the chamber surface 76 intersects the rear surface 68. The chamber surface 76 and the rear surface 68 define an interior angle α (FIG. 3B) between the surfaces 76 and 68 at the adhesive release edge 82a. The interior angle α is an acute angle so that the adhesive release edge 82 promotes sharp release of the adhesive 14 on the strand 12 from the nozzle body 30. The interior angle α is measured in an upstream direction along the machine direction from the adhesive release edge 82a. To this end, the interior angle α is defined by the nozzle body 30 at the adhesive release edge 82a. In the illustrated embodiment, the acute angle from the machine direction may be in the range of about 50 degrees to about 80 degrees. As the acute angle α is made smaller within this range (such as the relatively small acute angle α shown in FIG. 3B), the air flow from the air orifice 66 becomes more parallel to the movement of the strand 12 along the machine direction, which enables higher air pressures to be used for the air flow to spread the adhesive 14 without blowing the adhesive 14 off of the strand 12. The adhesive release edge 82a applies a wiping or spreading effect on the adhesive 14 without contacting the strand 12. This spreading effect increases as the strand 12 is positioned closer to the adhesive release edge 82a.

The air discharged from the air orifice 66 along the rear surface 68 as shown by arrows 18 also assists with release of adhesive 14 from the nozzle body 30 at the adhesive release edge 82a. The air traveling along the rear surface 68 strikes the upper surface 80 of the strand 12 at a non-perpendicular angle such that the formation of any eddy currents around the adhesive release edge 82a is believed to be discouraged. More specifically, the air strikes the upper surface 80 of the strand 12 at the acute angle α described above. Therefore, the adhesive 14 remains attached to the moving strand 12 downstream of the adhesive chamber 62 rather than building up on the nozzle body 30. As a result, the risk of adhesive 14 building up on the nozzle body 30 and blocking the air orifice 66 is substantially reduced or eliminated.

In the illustrated embodiment, the width of the strand 12 in a stretched condition is about 0.008 inches to 0.02 inches. The adhesive orifice 60 has a diameter of about 0.024 inches so that the adhesive 14 applied to the strand 12 begins spreading around the periphery 20 of the strand 12 immediately upon application in the adhesive chamber 62. The air orifice 66 has a diameter of about 0.02 inches in the illustrated embodiment. The pressure of air discharged through the air orifice 66 is set so that the air orifice 66 discharges approximately 0.15 to 0.50 cubic feet of air per minute. When only one air orifice 66 is used to discharge process air at each strand 12, the overall use of process air and the corresponding infrastructure necessary to provide the process air is reduced.

Figure 3C:
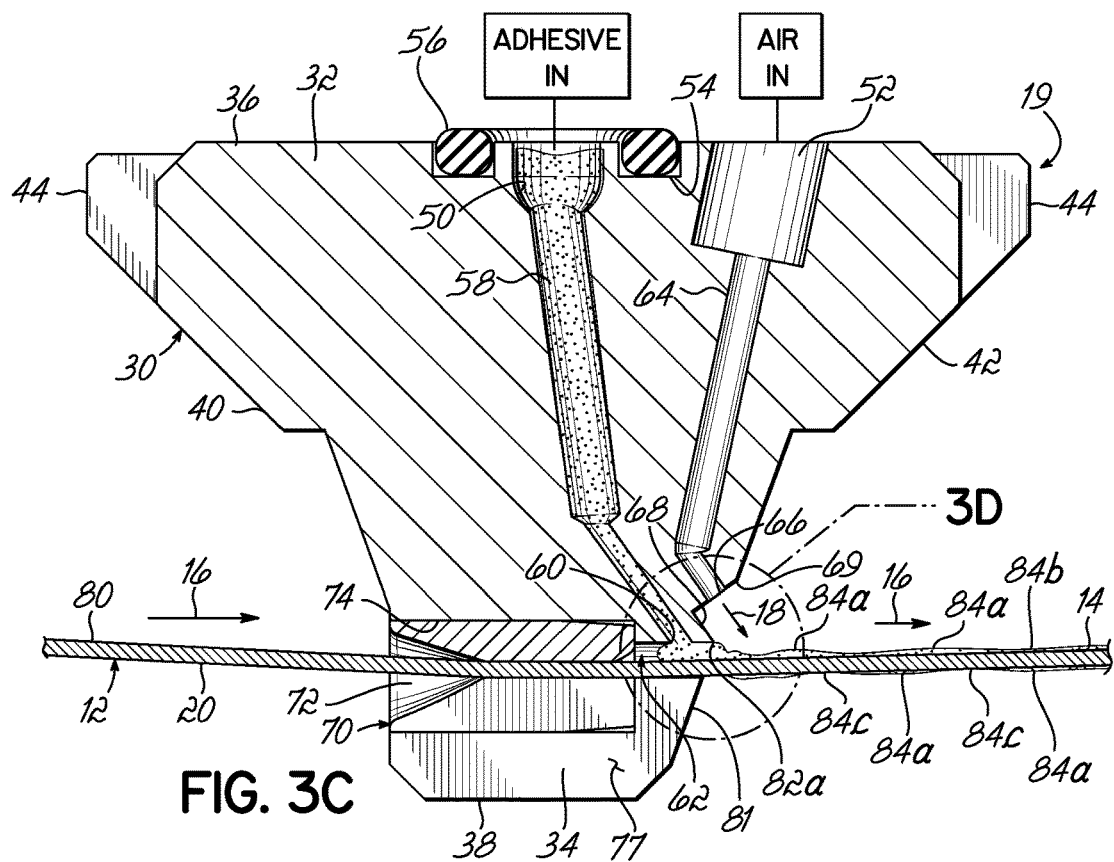
FIG. 3C is a side cross-sectional view of the nozzle similar to FIG. 3A, except that the strand is in an angled orientation relative to the nozzle body and the adhesive chamber.
Figure 3D:
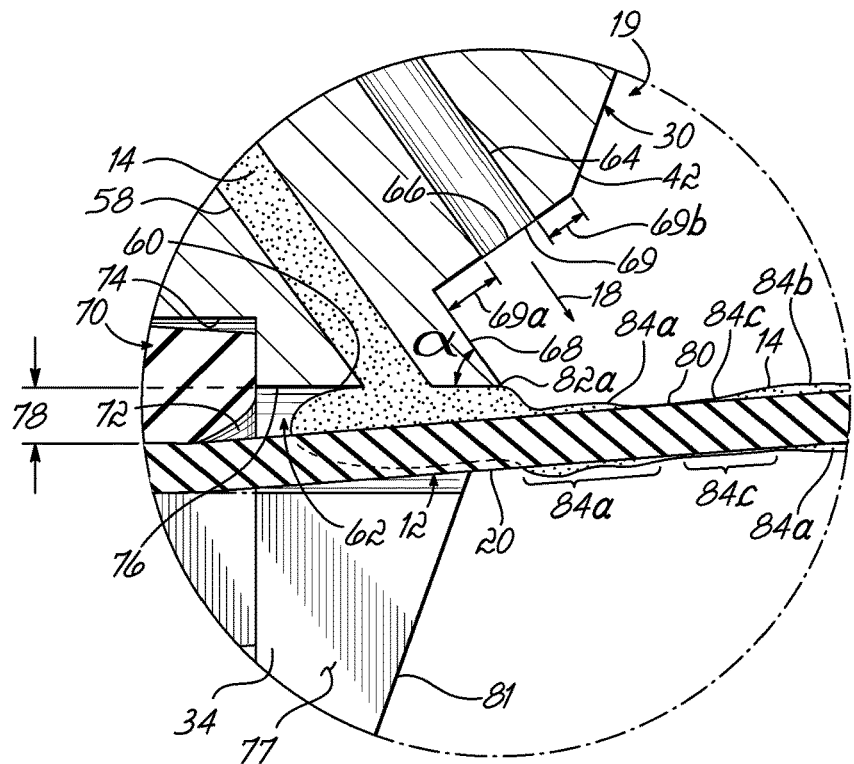
FIG. 3D is a detailed side cross-sectional view of the nozzle of FIG. 3C, further illustrating the adhesive release edge of the nozzle body.
Figure 4:
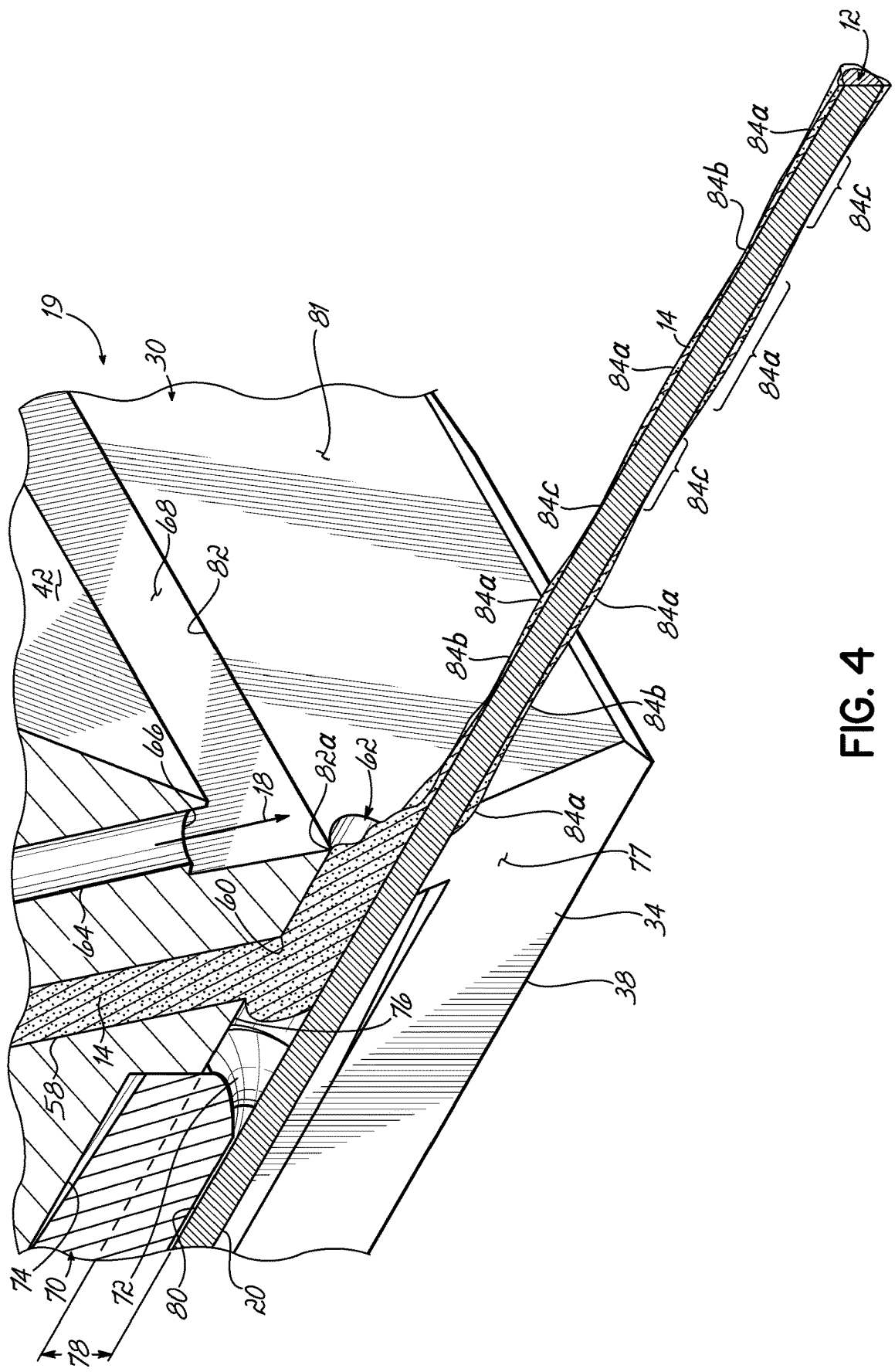
FIG. 4 is a perspective cross-sectional view of the nozzle of FIG. 2B along line 3-3, illustrating adhesive spreading onto the strand.

In another arrangement shown in FIGS. 3C and 3D, the nozzle body 30 has been moved downward with respect to the strand 12 such that the strand 12 angles upwardly on either side of the guide slot 72 and passes through the adhesive chamber 62 at an angle with respect to the chamber surface 76. To this end, the strand 12 moves within the adhesive chamber 62 so as to be closer to the chamber surface 76 at the exit of the adhesive chamber 62 that at the guide slot 72. In this orientation, the gap 78a between the chamber surface 76 and the upper surface 80 of the strand 12 narrows along the length of the adhesive chamber 62 such that an exit gap 78b at the exit of the adhesive chamber 62 is narrowed from the gap 78a. This narrowed exit gap 78b increases the amount of time that the adhesive 14 is located in the adhesive chamber 62, thereby causing increased spreading of the adhesive 14 around the periphery 20 of the strand 12 within the adhesive chamber 62 due to the effects of die swell. Once again, the gap 78a is sized within the range of about 0.005 inches to about 0.015 inches. The adhesive release edge 82a also applies a greater spreading effect on the adhesive 14 as a result of the narrowed exit gap 78b at the exit of the adhesive chamber 62. Therefore, the adhesive 14 is forced to begin spreading around the periphery 20 of the strand 12 before the strand 12 exits the adhesive chamber 62 and the nozzle body 30. It will be understood that the narrowing of the gap 78a along the length of the adhesive chamber 62 may be achieved in other manners while keeping the strand 12 generally horizontal, including but not limited to tapering the adhesive chamber 62.

The operation of the nozzle 19 is shown in FIGS. 3A-3D and 4. The adhesive passage 58 delivers the adhesive 14 through the adhesive orifice 60 to fill the adhesive chamber 62. The adhesive 14 is applied to the upper surface 80 of the strand 12 in the illustrated embodiment. The strand 12 then draws the adhesive 14 through the adhesive chamber 62 until the strand 12 emerges from the rear side 42 of the nozzle body 30. At this rear side 42, a portion of the adhesive 14 releases from the nozzle body 30 by virtue of the air moving along the rear surface 68 and the adhesive release edge 82a.

Upon release from the nozzle body 30, the adhesive 14 in contact with the strand is struck by additional air discharged from the air orifice 66 toward the elastic strand 12. The air causes the adhesive 14, which is only partially spread around the periphery 20 of the strand 12, to spread more around the periphery 20 of the strand 12 in order to coat the strand 12 with the adhesive 14. The air discharged from the air orifice 66 does not blow the adhesive 14 off of the strand 12 because the adhesive 14 is applied to the strand 12 and begins forming an adhesive bond with the strand 12 prior to being struck with the air. Additionally, the adhesive 14 coats substantially the entire periphery 20 of the strand 12 as explained below instead of wrapping a filament randomly around portions of the periphery 20.

The adhesive 14 forms a coating on the strand 12 that appears continuous to the naked eye, but it is believed that this coating is not entirely continuous along the length of the strand 12. As described above, the adhesive 14 is extruded from the adhesive orifice 60 into the adhesive chamber 62. The stretched elastic strand 12 is received in the adhesive chamber 62 as the strand 12 moves in the machine direction. Consequently, the adhesive 14 contacts the moving strand 12 and rapidly accelerates to be released from the nozzle 19 at the adhesive release edge 82a. The rapid acceleration of the adhesive 14 causes the adhesive 14 to be applied to the strand 12 in a semi-starved state, such that the amount of adhesive 14 varies along the length of the strand 12. It is believed, more particularly, that the adhesive 14 forms localized masses separated by thinner sections that preferably may break as the adhesive 14 is accelerated by the elastic strand 12. As a result, the adhesive 14 forms a coating with a plurality of thicker portions 84a, a plurality of thinner portions 84b, and preferably a plurality of void portions 84c where no adhesive 14 is on the strand 12. The localized masses of adhesive 14 are configured to become discrete bond points when securing the elastic strand 12 to one or both of the nonwoven substrates 24a, 24b. Then the adhesive 14 is struck with air from the air orifice 66, which causes spreading of the adhesive 14 that tends to further break the adhesive 14 into localized masses.

As a result of these operational steps, the resultant coating formed on the strand 12 is believed to include thickness irregularities along the length of the strand 12. In this regard, FIGS. 3B and 3D schematically illustrate that the adhesive 14 forms a coating with a plurality of thicker portions 84a, a plurality of thinner portions 84b, and preferably a plurality of void portions 84c where no adhesive 14 is on the strand 12. These portions 84a, 84b, 84c are shown as an artist's rendering and it will be appreciated that the actual appearance and distribution of these portions 84a, 84b, 84c may vary in actual use depending on operation parameters such as air pressure. The repeatable continuous appearance to the naked eye of the adhesive 14 on the strand 12 is desirable in hygiene products, but the thickness irregularities of the coating believed to be formed by the adhesive 14 advantageously results in the thicker portions 84a functioning as discrete bond points formed along the length of the strand 12 when adhered to one or more of the substrates 24a, 24b, as described in detail above. More specifically, when bonded between two nonwoven substrates 24a, 24b, the coated elastic strand 12 is coated with sufficient adhesive 14 to exhibit a high level of creep resistance and, by virtue of the discrete bond point effect, also exhibits a high level of force retraction.

In the exemplary coating operation described above in connection with the nozzle 19, the hot melt adhesive 14 used to coat the elastic strand 12 has a viscosity in the range of about 3,000 to about 12,000 centipoises and possibly higher depending on various operating parameters such as the air pressure. The lower viscosity of the adhesive 14 leads to improved bonding with a nonwoven substrate and improved penetration into the nonwoven substrate 24a, 24b. Furthermore, the nozzle 19 of the present invention can operate with a wide range of viscosities because of this broad potential adhesive viscosity range. The lower viscosity of the hot melt adhesive 14 also allows for the adhesive 14 to be applied at a higher temperature to the strand 12 and also reduces overall consumption of adhesive material to coat the strand 12. For example, the amount of hot melt adhesive 14 applied to the strand 12 is in the range of about 25 mg/meter to about 120 mg/meter. The higher application temperatures lead to better adhesive bonds being formed with the nonwoven substrate 24, even with less adhesive 14 consumption. Consequently, the nozzle 19 significantly reduces the costs of assembling hygiene products by reducing the amount of adhesive 14 and process air consumed and operating with lower adhesive viscosity.

Figure 5A:
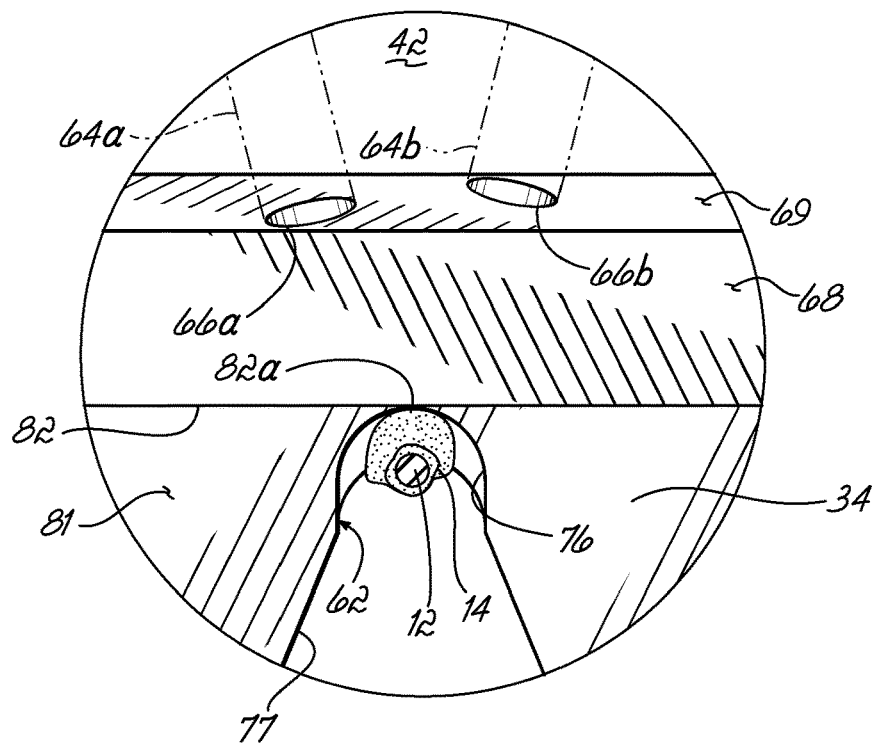
FIG. 5A is a rear side view of an alternative embodiment of a nozzle, showing multiple air passages in phantom.
Figure 5B:
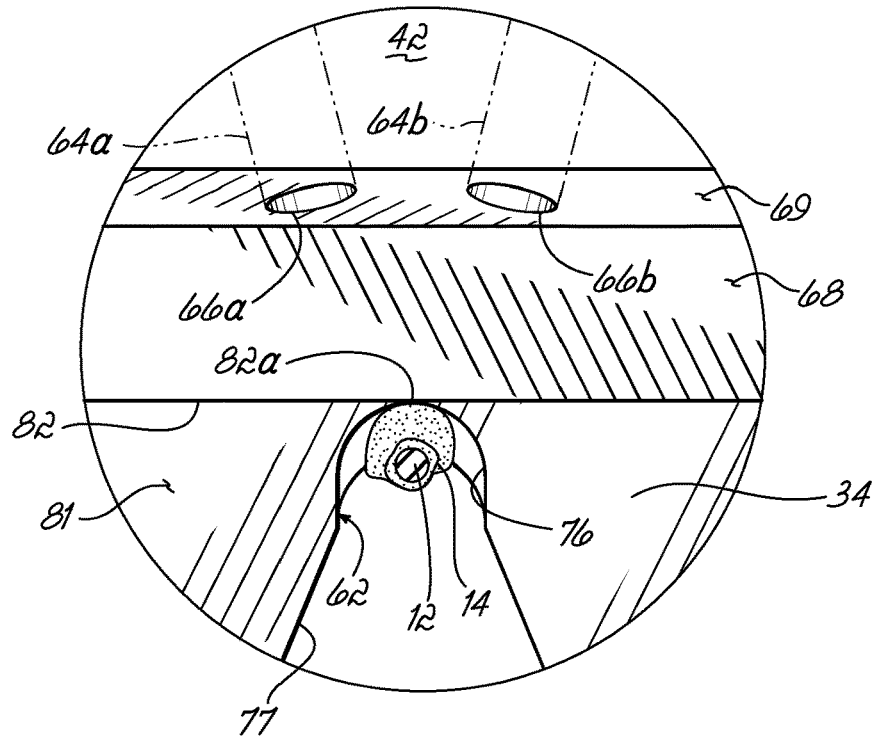
FIG. 5B is a rear side view of another alternative embodiment of a nozzle, showing multiple air passages in phantom.

In some alternative embodiments, the nozzle 19 includes an adhesive passage 58, multiple air passages 64, and multiple air orifices 66 for each strand 12. As shown in FIGS. 5A and 5B, the nozzle 19 includes a first air passage 64a and first air orifice 66a directed toward one side of the strand 12, and the nozzle 19 also includes a second air passage 64b and second air orifice 66b directed toward the opposite side of the strand 12. In one alternative shown in FIG. 5A, the first air passage 64a is staggered in the machine direction from the second air passage 64b such that the air flow from each air passage 64a, 64b strikes the adhesive 14 on the strand 12 in sequence. In another alternative shown in FIG. 5B, the first and second air passages 64a, 64b are aligned collinear and within a plane oriented perpendicular to the machine direction such that the air flow from each air passage 64a, 64b strikes the adhesive 14 on the strand 12 at about the same location. It will be understood that the number and orientation of the air passages 64 and air orifices 66 may be modified in other embodiments without departing from the scope of the invention. Furthermore, it will be understood that each air passage 64a, 64b continues to discharge air at an acute angle with respect to the machine direction to possibly discourage the formation of eddy currents. The first and second air passages 64a, 64b provide redundancy in case one of the air passages 64a, 64b becomes blocked, as either air passage 64a, 64b is capable of spreading the adhesive 14 around the strand 12. However, the provision of two or more air passages 64 can result in improved adhesive spreading.

Another embodiment of a contact nozzle 110 is illustrated in FIGS. 6-9. The nozzle 110 of this embodiment includes substantially all of the elements previously described with reference to the embodiment of FIGS. 2A-4, and these elements are repeated in FIGS. 6-9 with the same reference numbers as the previous embodiment. These elements and the advantageous operation of the nozzle 110 is not repeated in detail, as the following discussion focuses on the differences in this embodiment.

Figure 6:
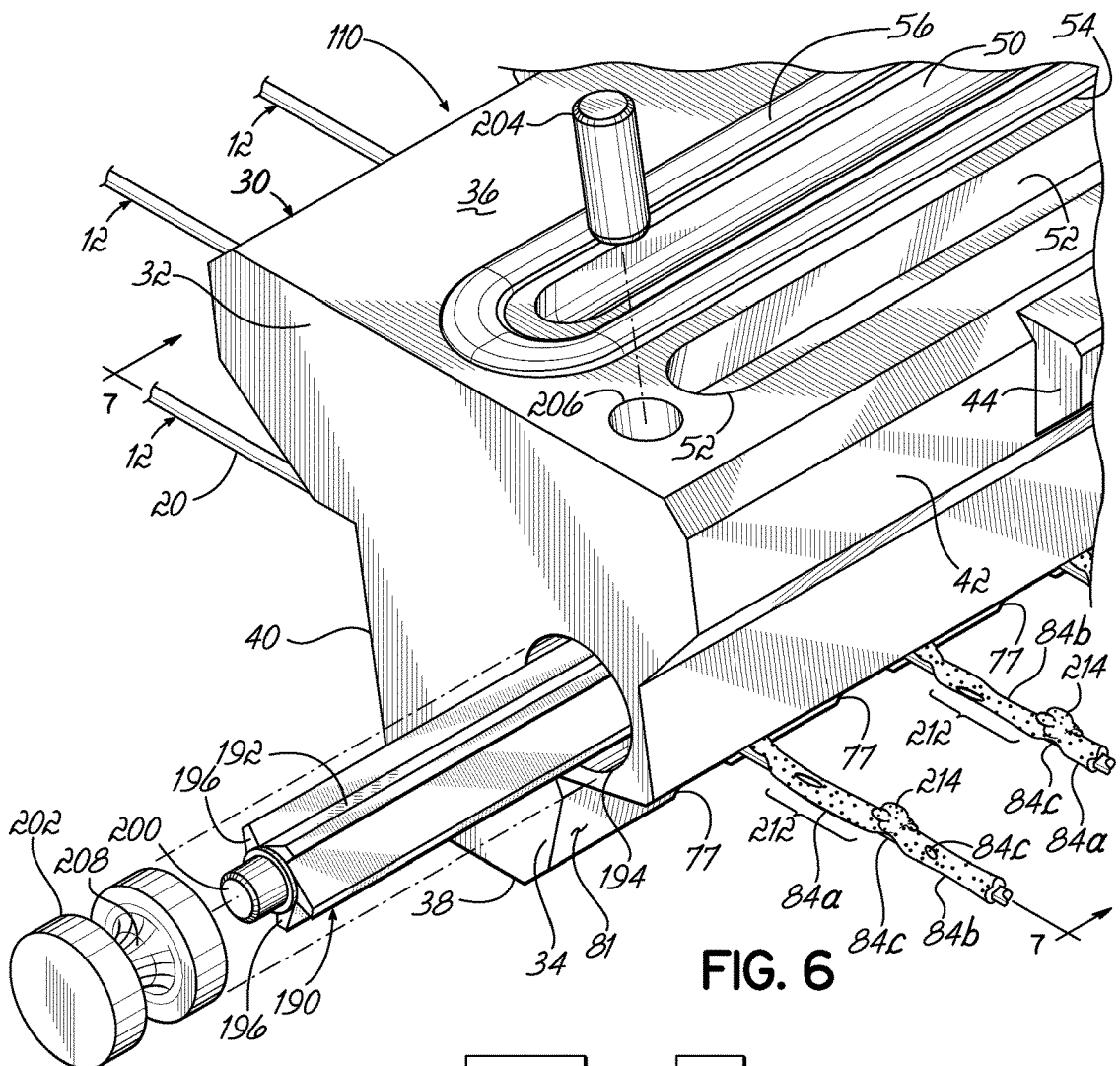
FIG. 6 is a perspective partially exploded view of another embodiment of a nozzle.
Figure 7:
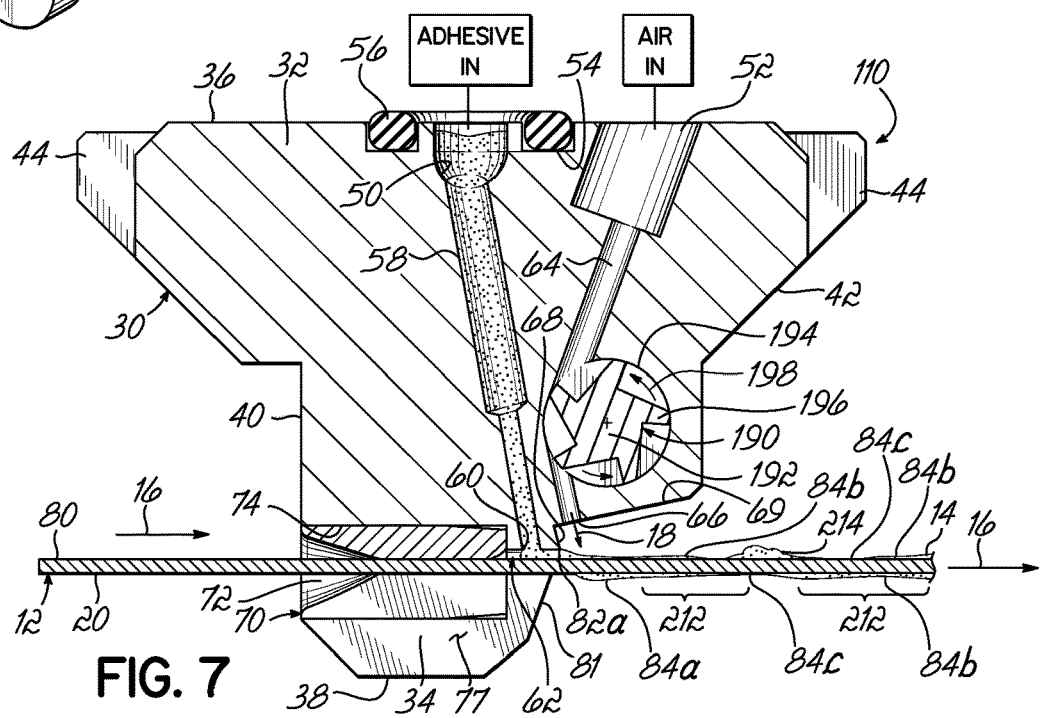
FIG. 7 is a side cross-sectional view of the nozzle of FIG. 6 along line 7-7, illustrating internal flow paths for adhesive and air.

As shown in FIGS. 6 and 7, the nozzle 110 of this embodiment further includes an air discharge control device 190 operatively coupled to the air passage 64 in the nozzle body 30. The air discharge control device 190 intermittently blocks pressurized air discharged from the air orifice 66. More particularly, the air discharge control device 190 of the illustrated embodiment includes an elongate rotatable member 192 positioned in a lateral aperture 194 through the nozzle body 30. The rotatable member 192 intermittently blocks air flow through the air passage 64. To this end, the rotatable member 192 includes a plurality of fins 196 that are rotated to intermittently block air flow through the air passage 64. As shown in FIG. 7 by arrows 198, the rotatable member 192 rotates the fins 196 in the air passage 64 to effectively divide a continuous air flow in the air inlet 52 into pulses of air flow at the air orifice 66. Consequently, the second coating nozzle 110 is operable to discharge pulses of air at the adhesive 14 on the elastic strand 12. It will be understood that the rotatable member 192 could be removed from the lateral aperture 194 to permit continuous air flow through the air passage 64 in other operations. Alternatively, the air discharge control device 190 includes an air control solenoid valve that selectively blocks air flow through the air passage 64 to form a continuous flow or a pulsed flow of air.

The rotatable member 192 includes lateral ends 200 engaged with end bearings 202 inserted into opposing sides of the lateral aperture 194. The end bearings 202 are held in position by locking pins 204 inserted through vertical apertures 206 in the nozzle body 30. More specifically, the locking pins 204 engage reduced-diameter portions 208 of the end bearings 202 to prevent movement of the end bearings 202 and the rotatable member 192 in the lateral direction out of the lateral aperture 194. It will be understood that the rotatable member 192 alternatively includes flow passages that intermittently come into communication with the air passage 64 rather than fins 196 in some embodiments. Furthermore in other embodiments, the rotatable member 192 is replaced by alternative structure operable to control air flow through the air passage 64.

Figure 8A:
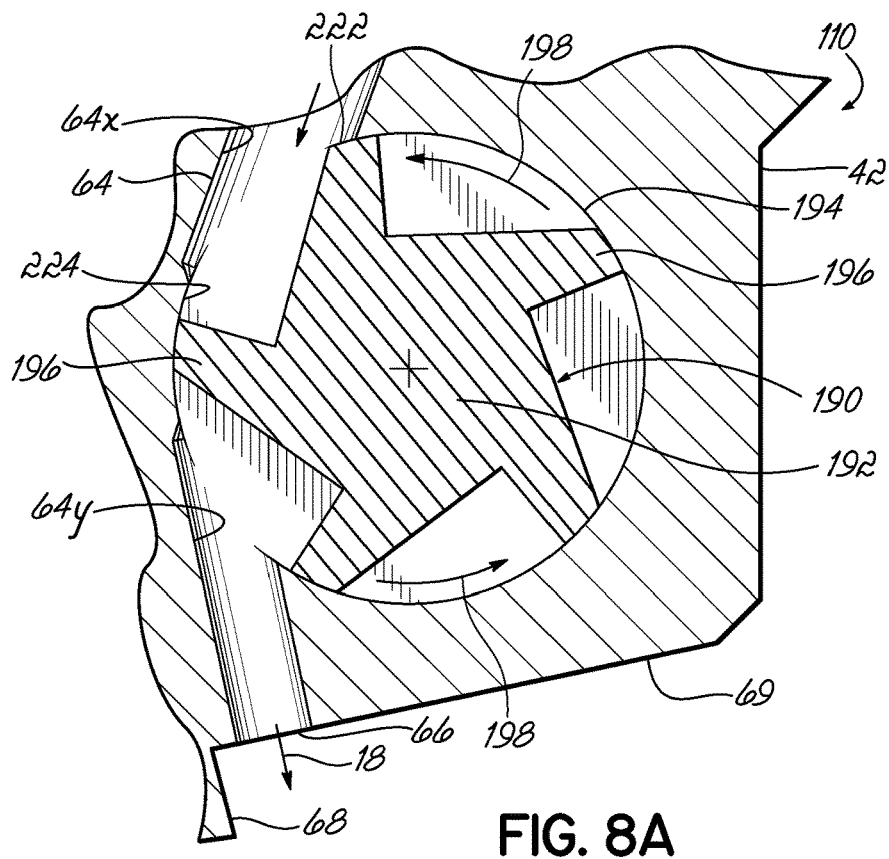
FIG. 8A is a detailed side cross-sectional view of the air discharge control device of FIG. 7 in a first position.
Figure 8B:
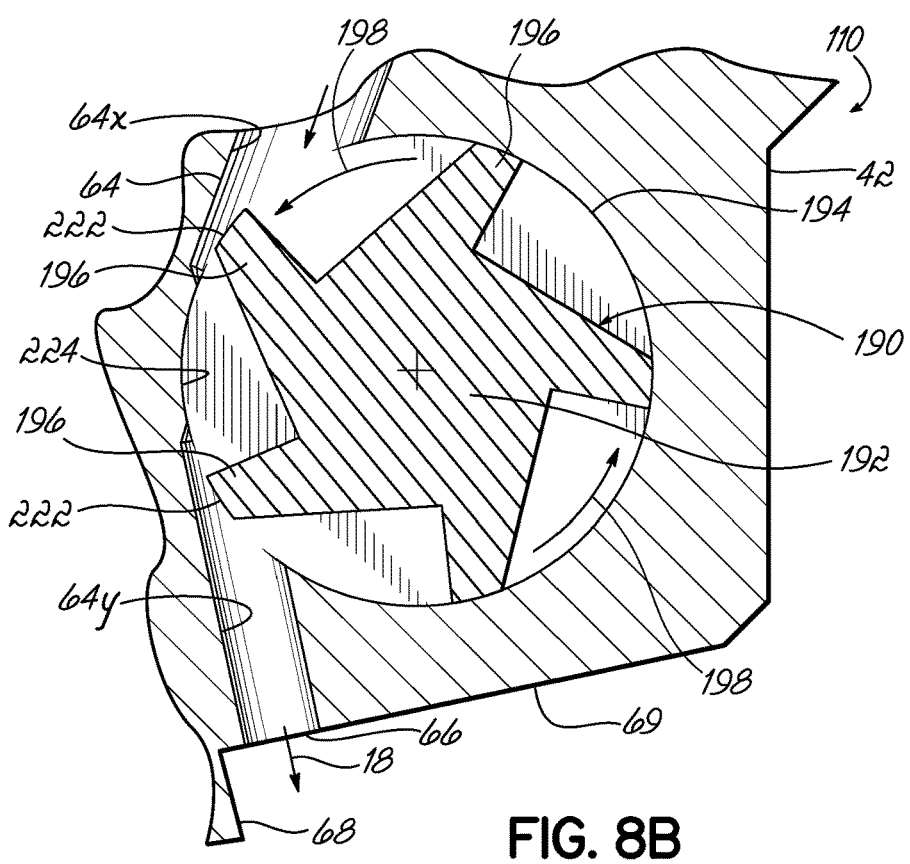
FIG. 8B is a detailed side cross-sectional view of the air discharge control device of FIG. 7 in a second position.

FIGS. 8A and 8B further illustrate the operation of the rotatable member 192 of the illustrated embodiment. The lateral aperture 194 divides the air passage 64 into an upper passage portion 64x leading to the air inlet 52 and a lower passage portion 64y leading to the air orifice 66. Each of the fins 196 defines an outer surface or land 222 that intermittently rotates into engagement with a wall portion 224 of the lateral aperture 194 extending between the upper and lower passage portions 64x, 64y. In the position shown in FIG. 8A, the land 222 of one of the fins 196 engages the wall portion 224 to effectively block passage of air from the upper passage portion 64x to the lower passage portion 64y. When the rotatable member 192 moves to the position shown in FIG. 8B, none of the lands 222 of the fins 196 are engaged with the wall portion 224 such that air may flow from the upper passage portion 64x to the lower passage portion 64y. Thus, as the rotatable member 192 rotates, the air flow through the air passage 64 and the air orifice 66 is pulsed.

Figure 9:
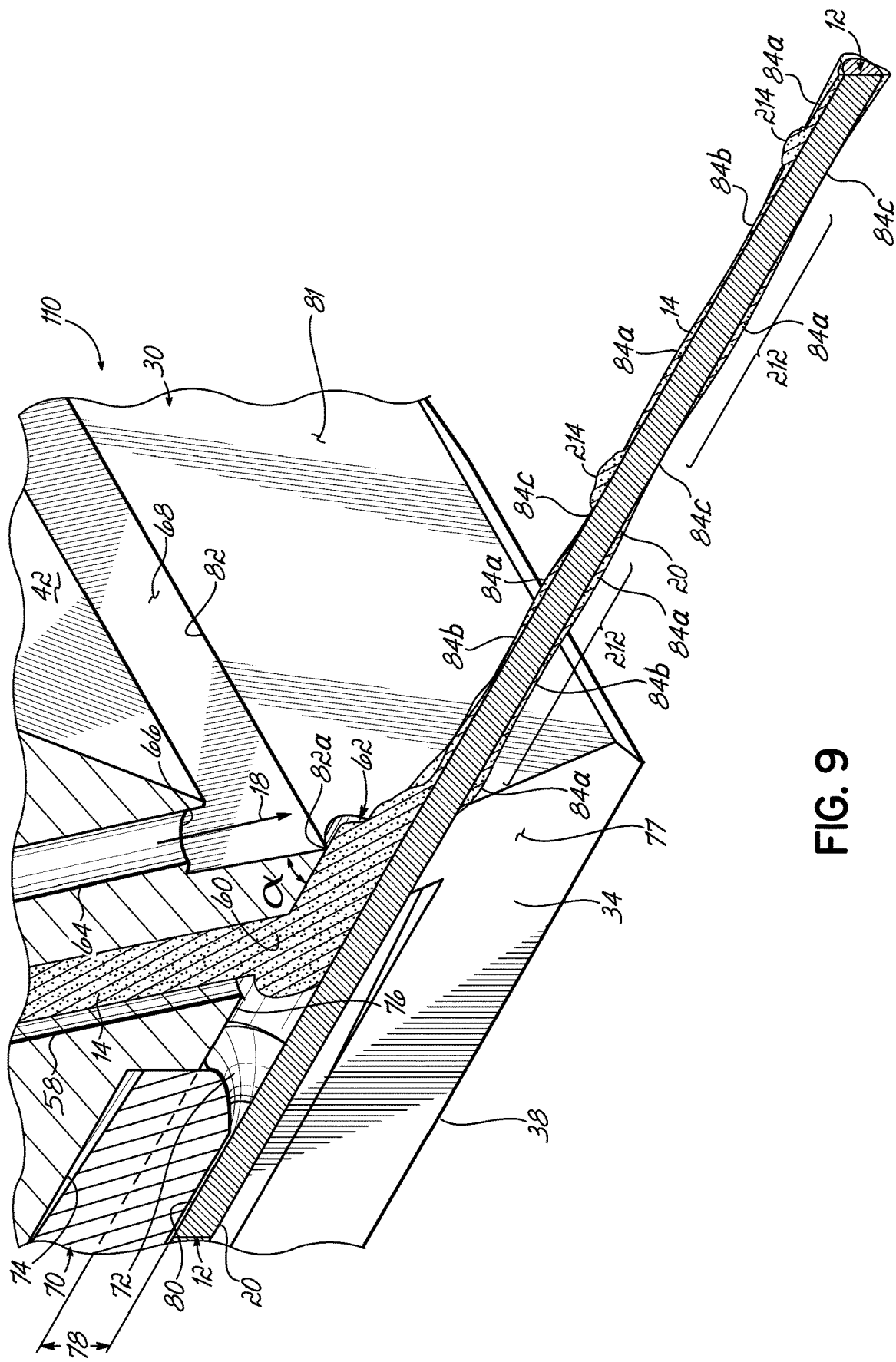
FIG. 9 is a perspective cross-sectional view of the nozzle of FIG. 6 along line 7-7, illustrating adhesive spreading onto the strand with pulsed air.

The rotatable member 192 is automatically driven by the pressure of the air flow or is separately driven, such as by an external motor (not shown). Thus, the frequency and length of the air pulses is controlled to any desired configuration. For example, the number and shape of fins 196 may be modified on the rotatable member 192 to modify the pulsed pattern of the air flow. The air discharge control device 190 is operable to produce any particular type of pulsed air discharge to meet the requirements of the user. The pulsing of the air flow may be between any two or more flow rates, one of which may be zero such as when the fins 196 completely block air flow through the air passage 64. When the air discharge is pulsed at regular intervals by the air discharge control device 190, the adhesive 14 is spread at regular intervals as shown in FIG. 9. In this regard, the strand 12 includes first portions 212 downstream of the nozzle 110 where the adhesive 14 is completely spread around the periphery 20 of the strand 12 and second portions 214 downstream of the nozzle 110 where the adhesive 14 remains only partially spread around the periphery 20 of the strand 12. In such an operation, the thicker amounts of adhesive 14 remaining on the upper surface 80 of the strand 12 at the second portions 214 form a discrete bond point effect when the strand 12 is coupled to the nonwoven substrate 24 at the bonding reel 22. This discrete bond effect is also enhanced by any thickness irregularity of the coating of adhesive 14 along the length of the strand 12 previously described with reference to the previous embodiment of FIGS. 2A-4. Also described above, this discrete bond point effect is advantageous because the elastic strand 12 when bonded between two nonwoven substrates 24a, 24b exhibits a high level of force retraction as well as a high level of creep resistance. Although the second portions 214 of the strand 12 are shown at a particular spacing in FIGS. 6-9, it will be appreciated that the spacing between these second portions 214 may be increased or reduced in other embodiments. It will also be understood that while the acute angle α is shown as a larger angle in this embodiment than in the embodiment shown in FIGS. 2A-4, the acute angle α still remains within the desired range of about 50 degrees to about 80 degrees for the reasons described in detail above.

Just like the previously described embodiment, the nozzle 110 significantly reduces the costs of assembling hygiene products by reducing the amount of adhesive 14 consumed and operating with lower adhesive viscosity. Thus, the nozzle 110 enables more reliable and economical coating of elastic strands 12.

Figure 10:
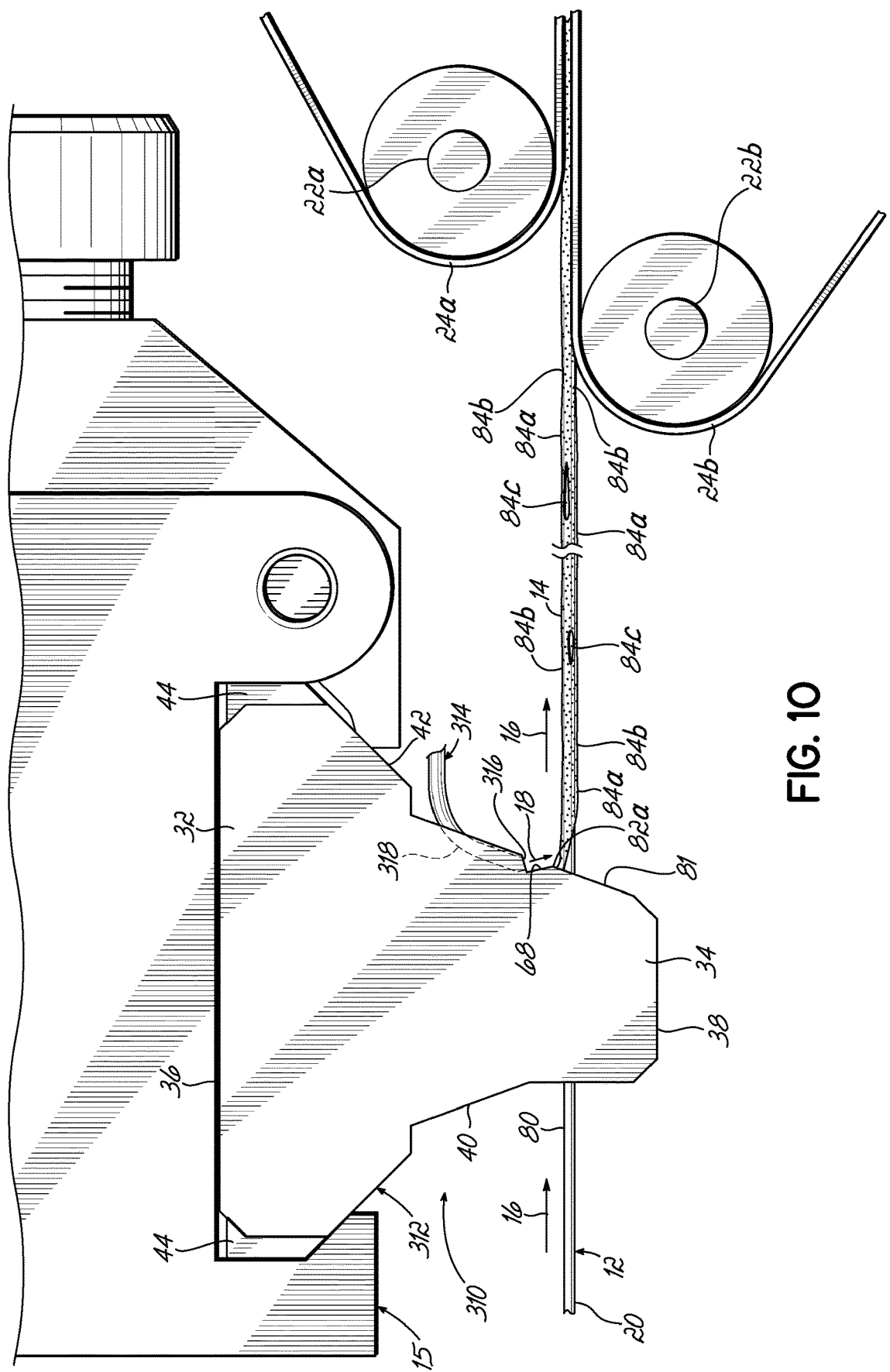
FIG. 10 is a schematic side view of another embodiment of an adhesive dispensing system in a nonwoven assembly process.
Figure 11:
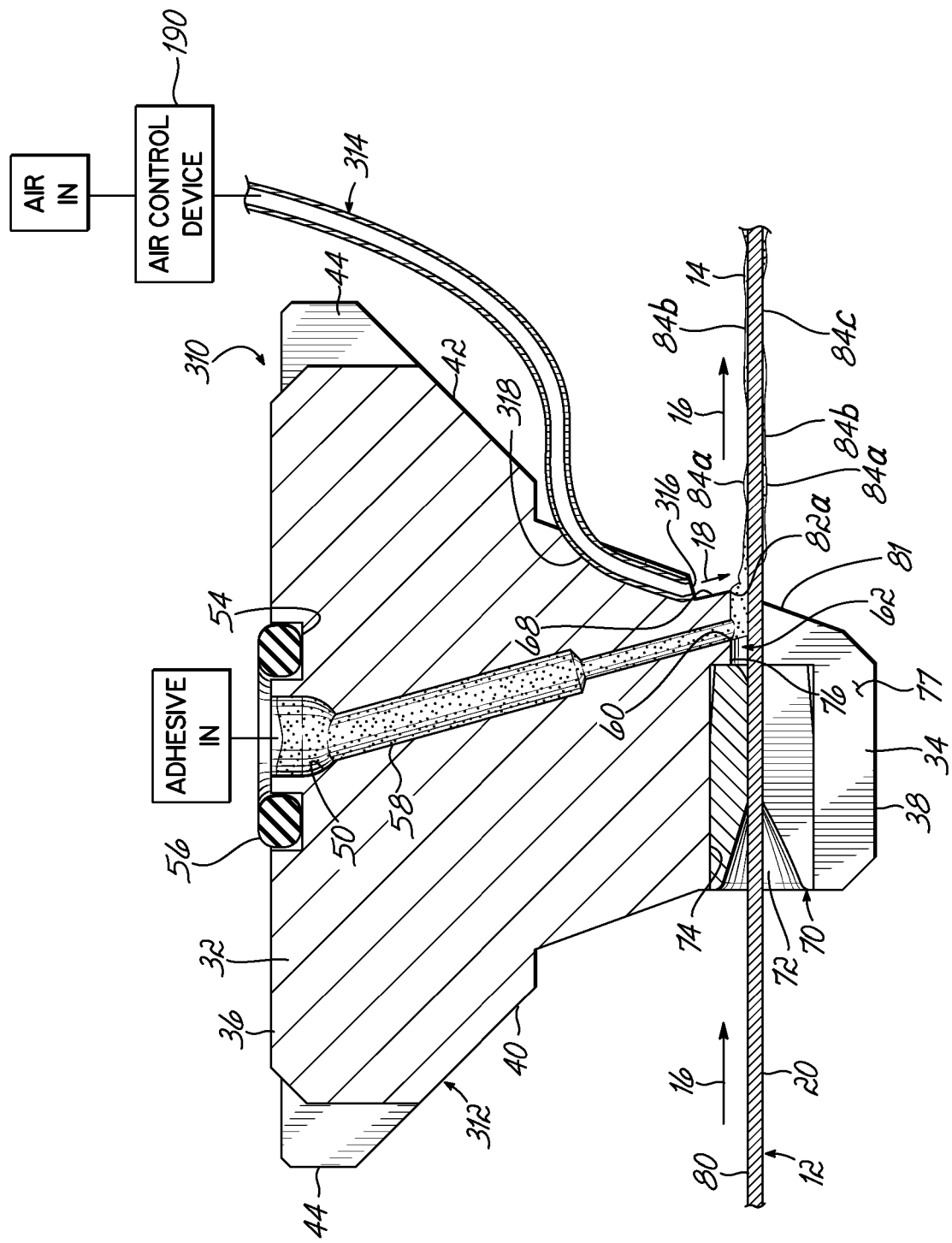
FIG. 11 is a side cross-sectional view of the adhesive dispensing system of FIG. 10, illustrating internal flow paths for adhesive and air.

An alternative embodiment of an adhesive dispensing system 310 for use in a hygiene product assembly process is shown in FIGS. 10 and 11. The adhesive dispensing system 310 includes a contact nozzle 312 including many of the same elements as the previously-described nozzles 19, 110. To this end, the same elements from the previous embodiments are numbered with the same reference numbers in this embodiment. The nozzle 312 again includes an adhesive passage 58 and an adhesive orifice 60 adapted to direct adhesive 14 to fill an adhesive chamber 62 (e.g., a slot 62) and be dispensed onto a moving elastic strand 12 in the adhesive chamber 62. The nozzle 312 of this embodiment does not include air passages or air orifices formed in the nozzle 312.

Instead, the adhesive dispensing system 310 further includes an air supply line 314. The air supply line 314 includes an air passage (not shown) and terminates in an air orifice 316 directed at the upper surface 80 of the strand 12. Thus, the air supply line 314 and air orifice 316 operate to discharge pressurized air at the strand 12, causing spreading of the adhesive 14 on the strand 12 as previously described in other embodiments. As shown in FIG. 11, the air supply line 314 is coupled to a slot 318 in the nozzle 312 so that the air supply line 314 is positioned proximate to the nozzle 312. In other embodiments, the air supply line 314 is held proximate the nozzle 312 by other known mounting devices and methods such as by the module 15. In the embodiment of FIGS. 10 and 11, the air orifice 316 discharges air along a rear surface 68 of the nozzle 312 so as to assist in releasing the adhesive 14 from the nozzle 312 at an adhesive release edge 82*a*.

Consequently, the adhesive dispensing system 310 of this embodiment operates similarly as the nozzles 19, 110 previously described. More specifically, the adhesive dispensing system 310 spreads the adhesive 14 on the elastic strand 12 in a substantially continuous manner or a pulsed manner. The adhesive dispensing system 310 can advantageously coat a strand 12 with adhesive 14 with low adhesive 14 consumption and a low adhesive viscosity, if desired. The adhesive dispensing system 310 is positioned to coat the strand 12 before the strand 12 travels to the previously described bonding reels 22*a*, 22*b* downstream from the air supply line 314 for coupling one or more nonwoven substrates 24*a*, 24*b* to the coated strand 12. Therefore, the adhesive dispensing system 310 improves the hygiene product assembly process.

Figure 12:
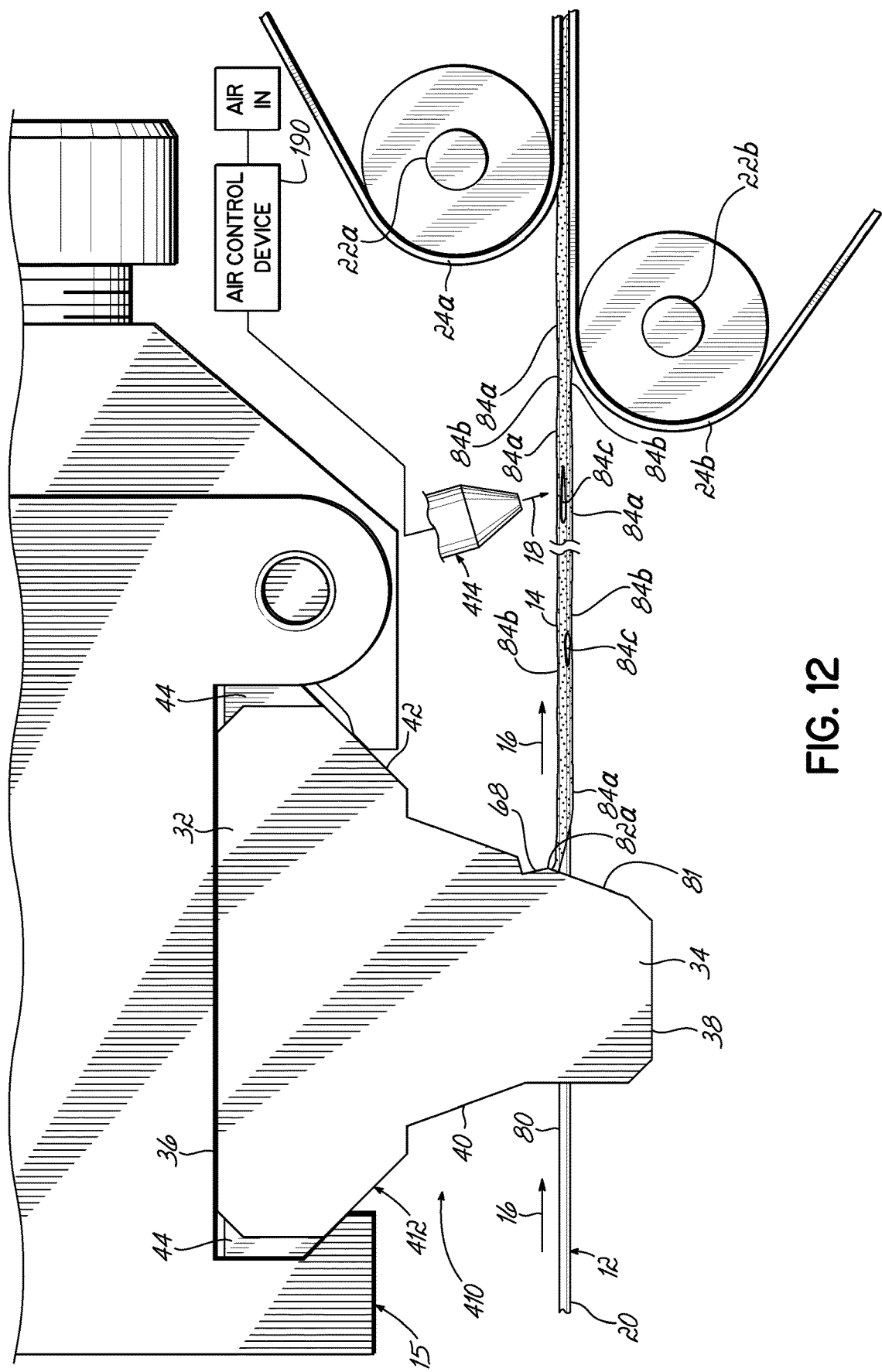
FIG. 12 is a schematic side view of yet another embodiment of an adhesive dispensing system in a nonwoven assembly process.

Yet another alternative embodiment of an adhesive dispensing system 410 for use in a hygiene product assembly process is shown in FIG. 12. Similar to the previously described adhesive dispensing system 310, this embodiment of the adhesive dispensing system 410 includes a contact nozzle 412 and an air supply line 414 positioned downstream from but proximate to the nozzle 412 in the machine direction. More particularly, the air supply line 414 is positioned to be spaced from the nozzle 412 so that the adhesive 14 is partially spread around the periphery 20 of the strand 12 prior to being impacted by pressurized air from the air supply line 414. In all other respects, the adhesive dispensing system 410 operates in the same manner as the previously described nozzles 19, 110 and system 310. Therefore, the adhesive dispensing system 410 is positioned to coat the elastic strand 12 before the strand 12 travels to the previously described bonding reels 22*a*, 22*b* downstream from the air supply line 414 for coupling one or more nonwoven substrates 24*a*, 24*b* to the coated strand 12. For all of the same reasons described in detail above, the adhesive dispensing system 410 improves the hygiene product assembly process.

An alternative embodiment of an adhesive dispensing system 510 for use in a hygiene product assembly process is shown in FIGS. 13-15D. The adhesive dispensing system 510 includes a contact nozzle 512 having a different configuration than the previously-described nozzles 19, 110, 312, 412. For example, the contact nozzle 512 of this embodiment does not include an elongate adhesive chamber or a separate strand guide as previously shown in the other embodiments. These differences are highlighted in further detail below.

Figure 13:
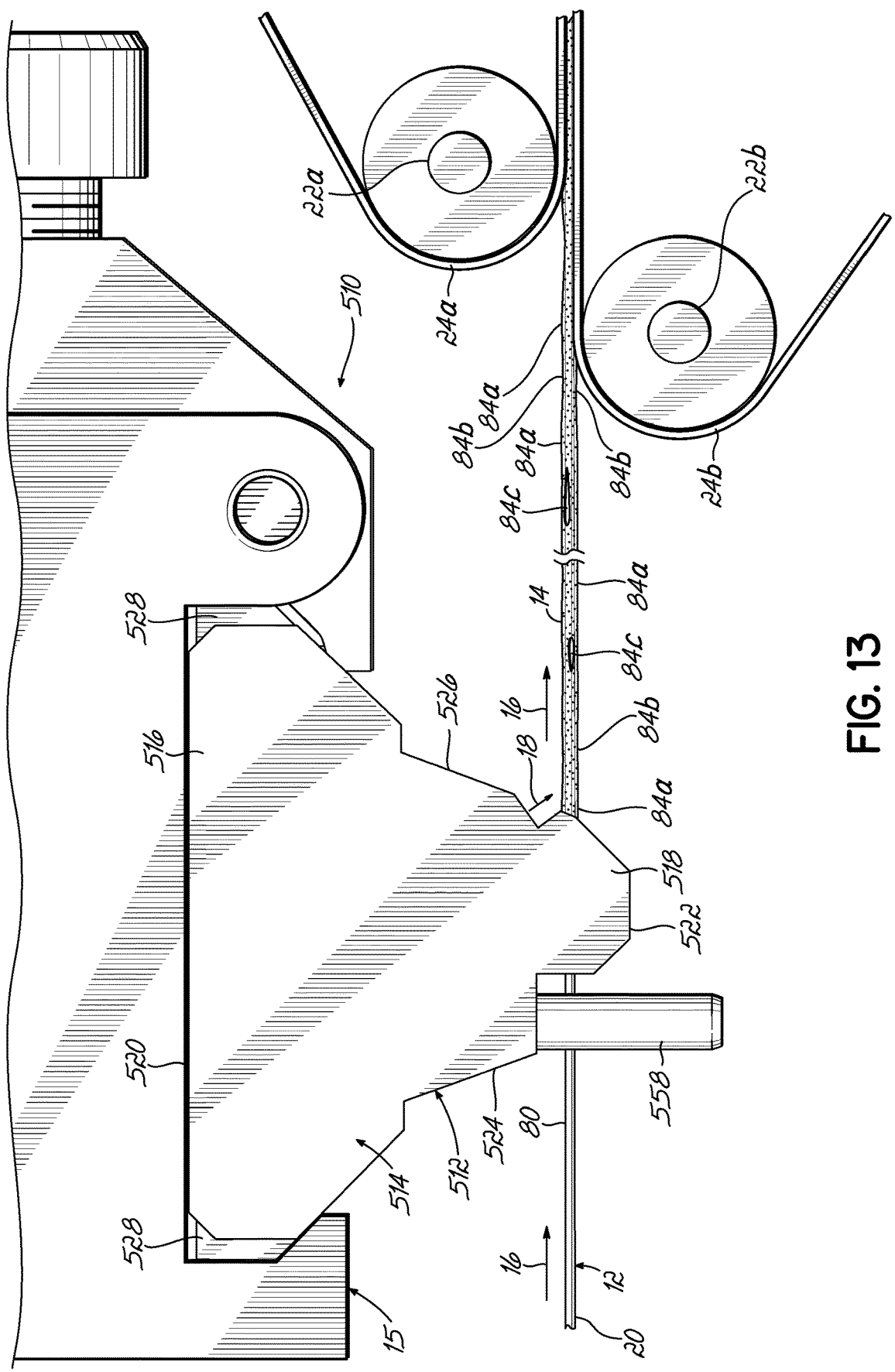
FIG. 13 is a schematic side view of another alternative embodiment of an adhesive dispensing system in a nonwoven assembly process, the adhesive dispensing system including a V-notch nozzle.

With particular reference to FIG. 13, the nozzle 512 is coating one or more stretched elastic strands 12 with a hot melt adhesive 14 so as to form an elasticized portion of a hygiene product such as a diaper or sanitary napkin. The nozzle 512 applies hot melt adhesive 14 onto the elastic strand 12 as the elastic strand 12 moves in a machine direction as indicated by arrows 16 in FIG. 13. The nozzle 512 then discharges pressurized air at the hot melt adhesive 14 as shown by arrows 18 to cause the hot melt adhesive 14 to spread around a periphery 20 of the elastic strand 12. The elastic strand 12 then continues in the machine direction to first and second bonding reels 22*a*, 22*b* that couple first and second nonwoven substrates 24*a*, 24*b* such as top and bottom sheets of a typical diaper to the elastic strand 12 in a sandwich-like construction. In this regard, the basic operation of the adhesive dispensing system 510 is similar to the general operation of the previously described embodiments.

The nozzle 512 is shown in further detail in FIGS. 14A through 15D. The nozzle 512 is a V-notch nozzle 512 including a nozzle body 514 having an upper body portion 516 and a lower body portion 518. The nozzle body 514 also includes a top side 520, a bottom side 522, a front side 524 extending between the top and bottom sides 520, 522, and a rear side 526 extending between the top and bottom sides 520, 522. The top side 520 defines a mounting surface configured to abut a module 15 when the nozzle 512 is coupled to the module 15. The upper body portion 516 is generally longer along the machine direction than the lower body portion 518 from the front side 524 to the rear side 526, thereby giving the nozzle 512 a tapered appearance from the top side 520 to the bottom side 522. Thus, the upper body portion 516 defines connection portions 528 along the front side 524 and the rear side 526 for aligning the nozzle 512 with the module 15. The nozzle 512 is clamped to the module 15 such that the top side 520 is coupled to the module 15 as well understood from U.S. Pat. Nos. 6,676,038 and 7,559,487. In some embodiments, the nozzle body 514 may have a different shape and size, including but not limited to being formed by stacked plates.

Figure 14A:
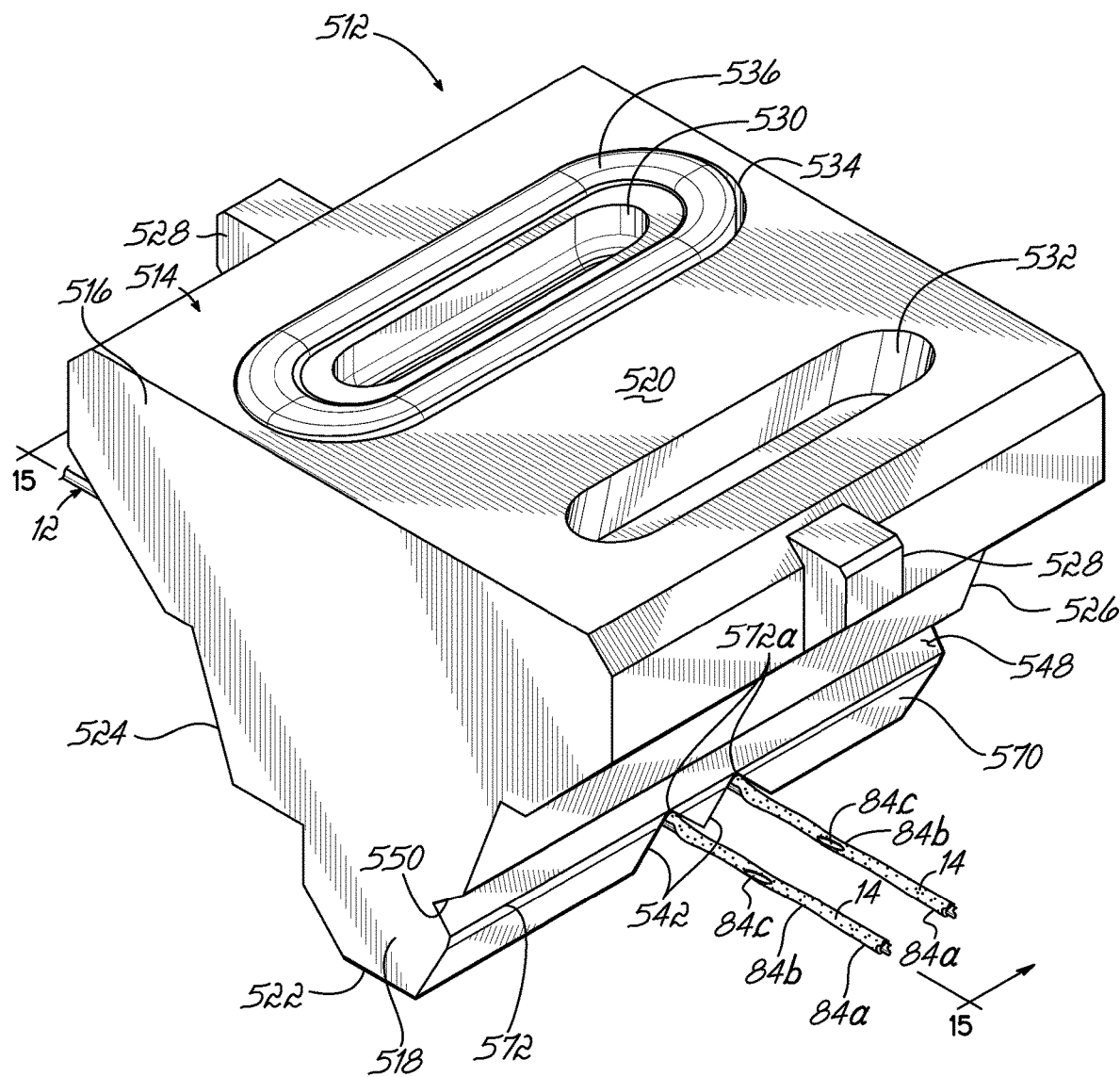
FIG. 14A is a rear side perspective view of the V-notch nozzle of FIG. 13.
Figure 14B:
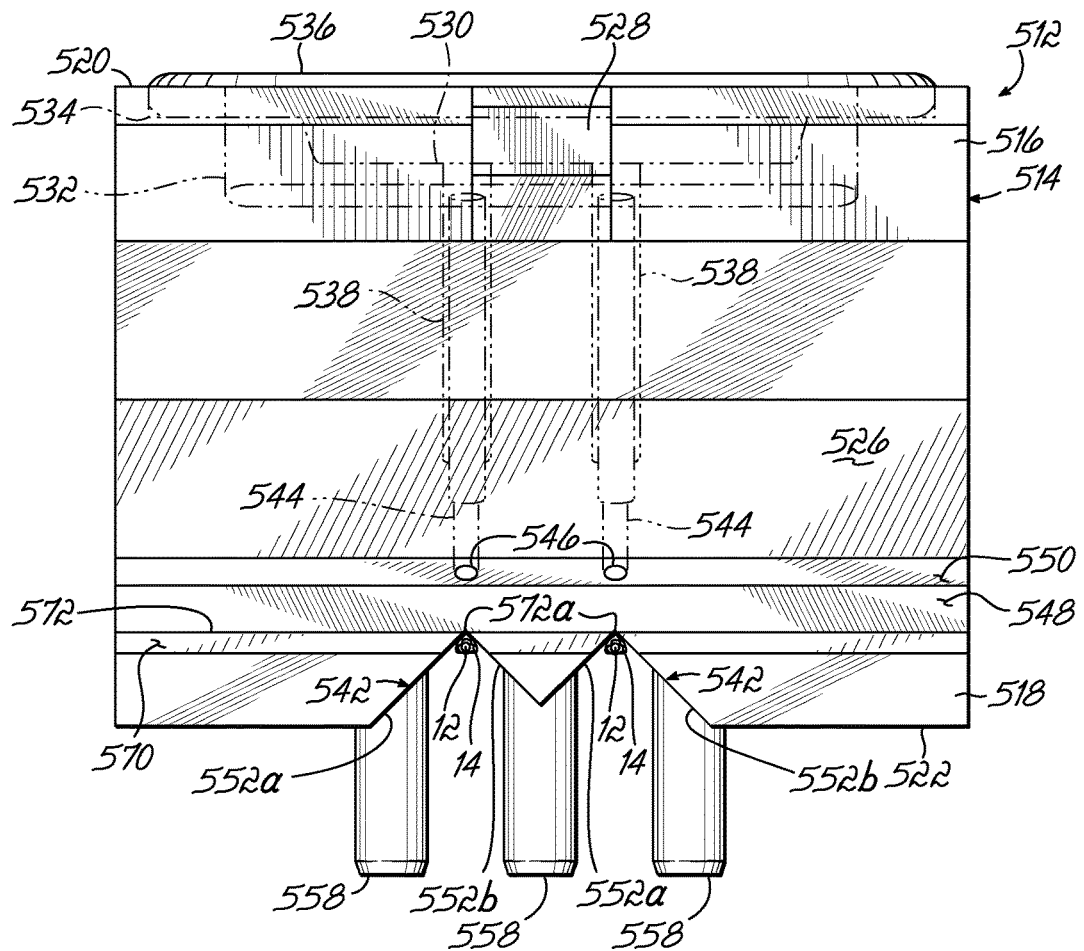
FIG. 14B is a rear side view of the V-notch nozzle of FIG. 13, showing multiple air passages in phantom.

With reference to FIG. 14A, the nozzle 512 further includes an adhesive inlet 530 and an air inlet 532 disposed along the mounting surface at the top side 520 of the nozzle body 514. The adhesive inlet 530 is surrounded by a seal groove 534 that receives a seal member 536 between the nozzle 512 and the previously-described module 15. The adhesive inlet 530 is fluidically coupled to a plurality of adhesive passages 538 formed in the nozzle body 514 and extending into the lower body portion 518 of the nozzle body 514. Although two adhesive passages 538 are shown in FIG. 14B, more or fewer adhesive passages 538 may be coupled to the adhesive inlet 530 in other embodiments of the nozzle 512. Each adhesive passage 538 is spaced from adjacent adhesive passages 538 in a lateral direction transverse to the machine direction. Each adhesive passage 538 delivers adhesive 14 from the adhesive inlet 530 to an adhesive orifice 540 communicating with a respective slot in the form of a V-shaped notch 542 (hereinafter V-notch 542) formed near the bottom side 522 of the nozzle body 514. The V-notch 542 operates inherently as a strand guide for the nozzle 512 and replaces the strand guide and elongate adhesive chamber of the previous embodiments, although a separate expansion chamber is described in further detail below. These and other features of the V-notch 542 are described in further detail with reference to FIGS. 14C, 15A, and 15B below.

In a similar manner, the air inlet 532 is fluidically coupled to a plurality of air passages 544 formed in the nozzle body 514 and extending into the lower body portion 518. Each air passage 544 is positioned proximate to and directly rearward of the respective adhesive passage 538 within the nozzle body 514. In this regard, each set of one adhesive passage 538 and one air passage 544 coats one strand 12 passing through the nozzle 512. As shown in FIG. 15A, it will be understood that at least a lower portion of the adhesive passage 538 and the air passage 544 are manufactured so as to be generally parallel to one another, thereby avoiding interferences between the air passages 538, 544 within the nozzle body 514. Each air passage 544 delivers air from the air inlet 532 to an air orifice 546 directed at the adhesive 14 in contact with the strand 12. More particularly, the air orifice 546 is positioned adjacent to a rear surface 548, which is part of the rear side 526 of the nozzle body 514. As such, air discharged from the air passage 544 and the air orifice 546 is directed along the rear surface 548 to act on the adhesive 14 as the strand 12 exits the V-notch 542. As shown most clearly in FIGS. 14C and 15D, the air orifice 546 is formed in an intermediate surface 550 extending from the rear surface 548. The thicknesses 550a and 550b of the intermediate surface 550 on opposite sides of the air orifice 546 are minimized so as to reduce any eddy currents that tend to form adjacent oblique surfaces surrounding the air orifice 546. The reduction of eddy currents along the intermediate surface 550 makes the delivery of air toward the strand 12 more laminar.

Figure 14C:
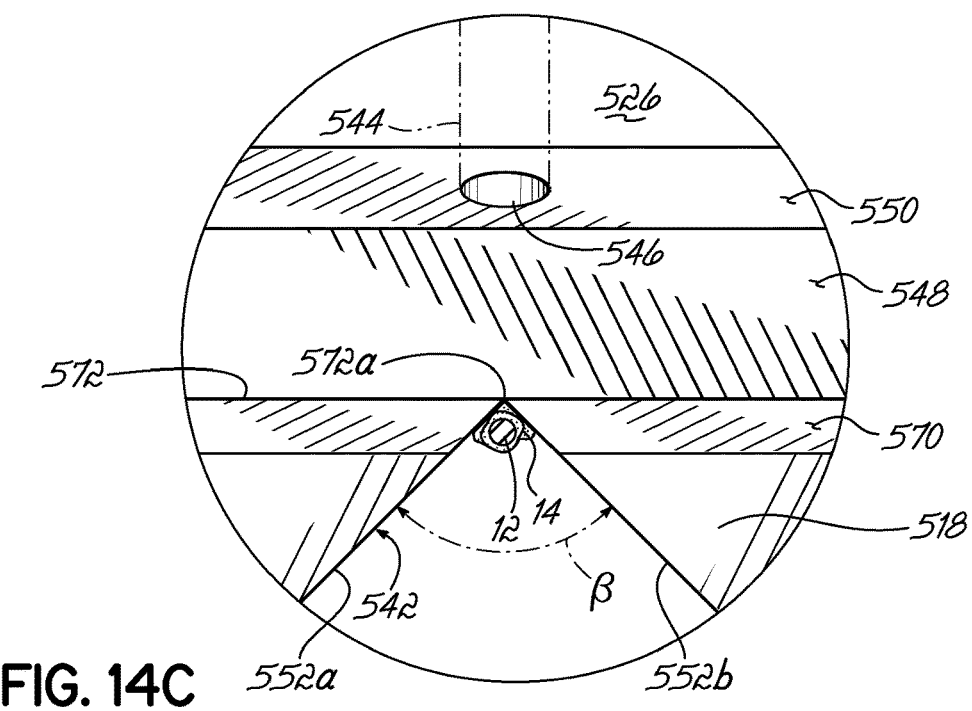
FIG. 14C is a detailed rear side view of the V-notch nozzle of FIG. 13, showing the adhesive being applied within one of the notches.
Figure 15A:
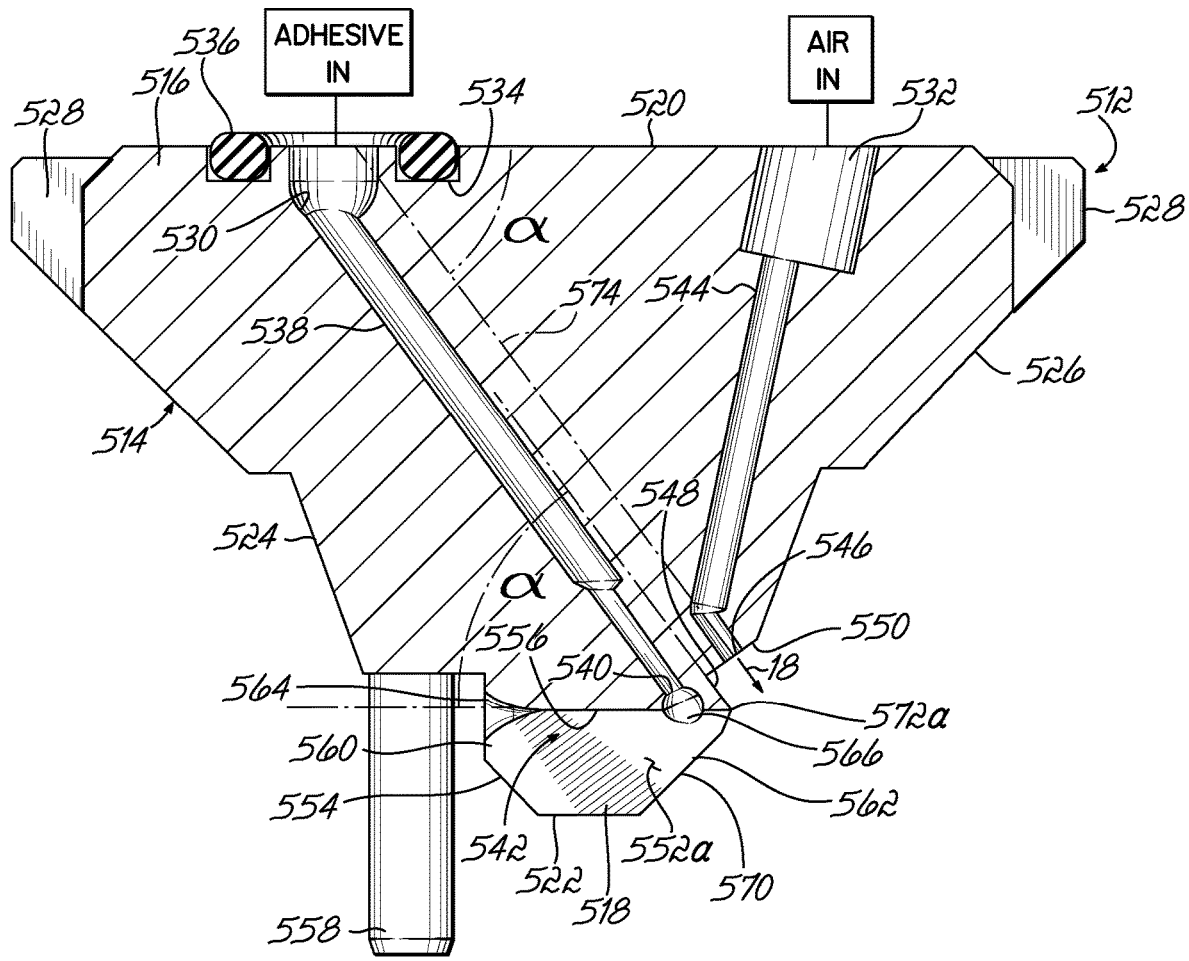
FIG. 15A is a side cross-sectional view of the V-notch nozzle of FIG. 14A along line 15-15, illustrating internal flow passages for adhesive and air and one of the notches without adhesive or a strand located within the notch.

With reference to FIGS. 14B and 14C, the V-notches 542 (e.g., slots 542) of the nozzle body 514 are shown in greater detail. In this regard, each V-notch 542 is defined by two elongate converging surfaces 552a, 552b extending from an access slot 554 defined at the bottom side 522 of the nozzle body 514 to a top edge 556 where the converging surfaces 552a, 552b intersect. Each of the converging surfaces 552a, 552b is generally planar such that the V-notch 542 defines a notch angle β between the converging surfaces 552a, 552b. The notch angle β is illustrated in this exemplary embodiment as about 90 degrees, although it will be understood that the notch angle β may alternatively be within a range of about 60 degrees to about 90 degrees in other embodiments consistent with the current invention. The access slot 554 communicates with the V-notch 542 so that an elastic strand 12 can be inserted upwardly from below the nozzle body 514 into position within the V-notch 542. More specifically, the elastic strand 12 is moved from the access slot 554 into engagement with both converging surfaces 552a, 552b adjacent the top edge 556. The top edge 556 is preferably formed so as to be dead sharp between the converging surfaces 552a, 552b, but it will be understood that the top edge 556 may define a radius of curvature of up to 0.01 inches without departing from the scope of the invention. As a result of the convergence of the surfaces 552a, 552b and the sharp dimensioning of the top edge 556, the V-notch 542 defines a strand guide and no additional strand guide element is necessary to accurately position the elastic strand 12 adjacent the top edge 556 when the elastic strand 12 is positioned within the V-notch 542.

Although no additional strand guide element is necessary with the nozzle body 514 to position the elastic strand 12 within the V-notch 542, the nozzle 512 also includes a series of alignment pins 558 extending downwardly from the front side 524 of the nozzle body 514. The alignment pins 558 are therefore located a small distance upstream from the V-notches 542 in a machine direction as previously described. More specifically, each V-notch 542 includes an inlet end 560 (FIG. 15A) bounded in opposing lateral directions by two of the alignment pins 558. When an elastic strand 12 is moved upwardly through the access slot 554, the elastic strand 12 is therefore also positioned between these two alignment pins 558. The alignment pins 558 function to prevent "jumping" or unintentional movement of an elastic strand 12 from one V-notch 542 to another V-notch 542. For example, an elastic strand 12 may include a knot tied between free ends of two supply reels of the elastic strand 12 in order to enable continuous running of the elastic strand 12 through the nozzle 512. When such a knot encounters the inlet end 560 of the V-notch 542, the larger size of the knot may cause the elastic strand 12 to "jump" temporarily away from the top edge 556 of the V-notch 542 towards the access slot 554. This jump away from the V-notch 542 may be significant enough to move the strand 12 below the access slot 554, which could hypothetically lead to re-entry of that strand 12 into a different adjacent access slot 554 and V-notch 542. However, the alignment pins 558 prevent such a jump into an adjacent access slot 554 and V-notch 542 when such an event occurs. Although the alignment pins 558 define a generally cylindrical shape in the illustrated embodiment to reduce any potential frictional contact with the elastic strands 12, it will be understood that differently shaped and sized alignment pins 558 may be used in other embodiments. It will also be understood that the alignment pins 558 may be used to keep each elastic strand 12 aligned with the respective V-notch 542 when a conventional lifting bar (not shown) is used to temporarily lift each of the elastic strands 12 out of the V-notches 542, such as during breaks in operation of the nozzle 512.

Figure 15B:
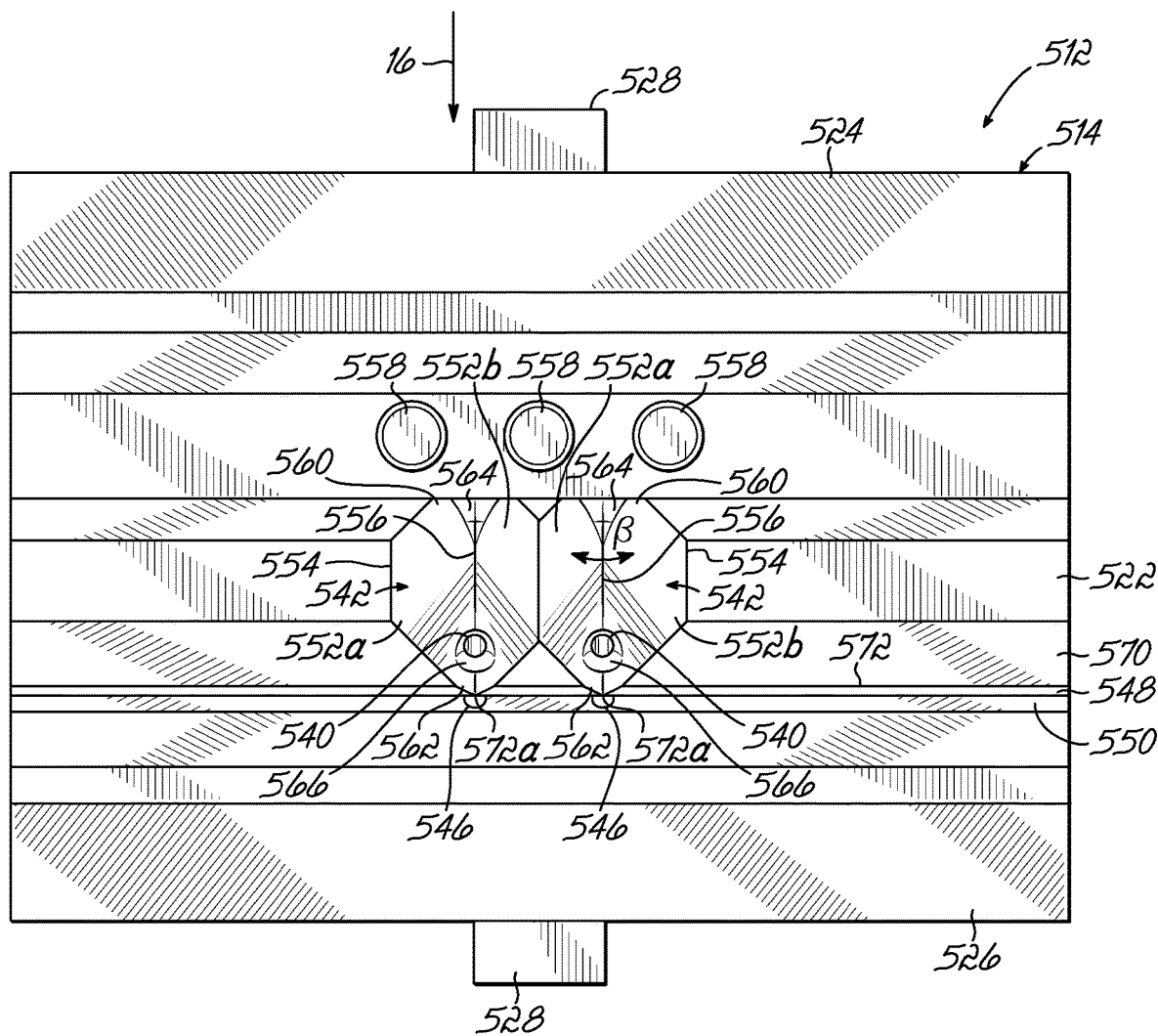
FIG. 15B is a bottom view of the V-notch nozzle of FIG. 15A, further illustrating the notch and an adhesive orifice communicating with the notch.

Further features of the V-notch 542 and the nozzle body 514 are shown in FIGS. 15A and 15B, in which the elastic strand 12 and the adhesive 14 are not shown to reveal additional elements. To this end, the V-notch 542 extends from the inlet end 560 located at the front side 524 of the nozzle body 514 adjacent the alignment pins 558 to an outlet end 562 located at the rear side 526 of the nozzle body 514. As described in further detail below, the intersection of the V-notch 542 with this rear side 526 and the corresponding air flow at the rear side 526 encourages release of adhesive material from the nozzle 512. Adjacent the inlet end 560, the converging surfaces 552a, 552b include chamfered opening portions 564 that broaden the size of the opening into the V-notch 542, thereby reducing a likelihood of the elastic strand 12 running past a sharp edge of the nozzle body 514. Over halfway along the length of the V-notch 542 (e.g., at a location closer to the outlet end 562 than the inlet end 560), the V-notch 542 is in fluid communication with the adhesive passage 538 via the adhesive orifice 540. As shown most clearly in the bottom view of FIG. 15B, an expansion chamber 566 is formed by using a ball-nose shaped mill to expand the size of the intersection between the V-notch 542 and the adhesive orifice 540. The expansion chamber 566 includes a rounded profile and extends a small distance above the top edge 556 of the V-notch 542 such that the adhesive orifice 540 defines a substantially planar outlet for adhesive material to flow into the expansion chamber 566. As a result of the effects of die swell within the larger diameter expansion chamber 566, the adhesive 14 will initially expand within the expansion chamber 566 and will be discharged from the expansion chamber 566 into contact with the elastic strand 12 and into the V-notch 542. The addition of the expansion chamber 566 enables the use of a smaller diameter adhesive orifice 540, such as 0.020 inches in the exemplary embodiment, which reduces the likelihood of adhesive material dripping out of the adhesive orifice 540 between dispensing cycles. In one example when a ball-nose shaped mill is used to form the expansion chamber 566, the adhesive orifice 540 may define a diameter of about 0.020 inches while the expansion chamber 566 defines a diameter of about 0.050 inches to about 0.070 inches. It will be understood that the expansion chamber 566 may be formed by other known cutting, drilling, and machining methods such as cutting scallop-shaped cutouts into the converging surfaces 552a, 552b in other embodiments to modify the shape or size of the expansion chamber 566 without departing from the scope of the current invention. It will also be appreciated that the diameter of the adhesive orifice 540 may be modified to adjust the velocity or flow of the adhesive 14 exiting the expansion chamber 566 and spreading around the elastic strand 12 in other embodiments consistent with the current invention.

Figure 15C:
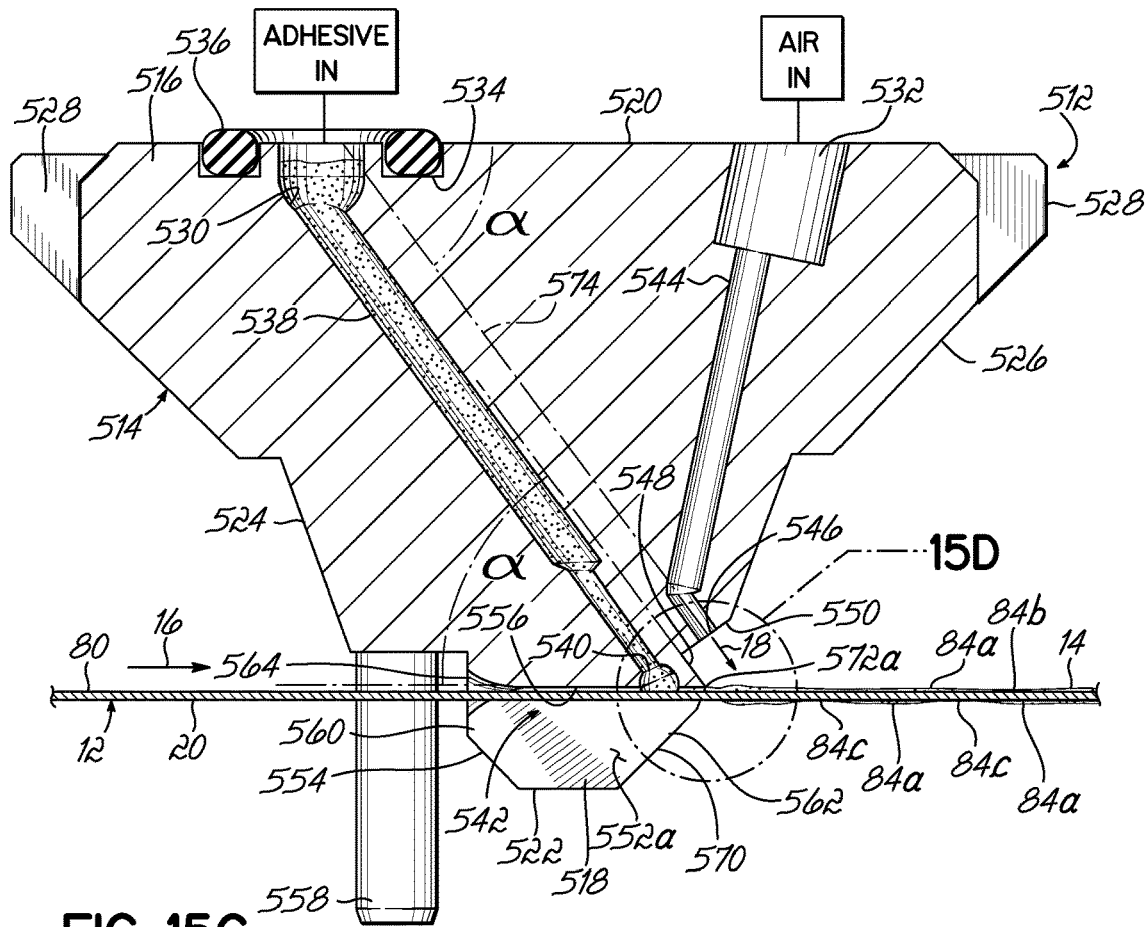
FIG. 15C is a side cross-sectional view of the V-notch nozzle similar to FIG. 15A, with adhesive material being applied to a strand within the notch.
Figure 15D:
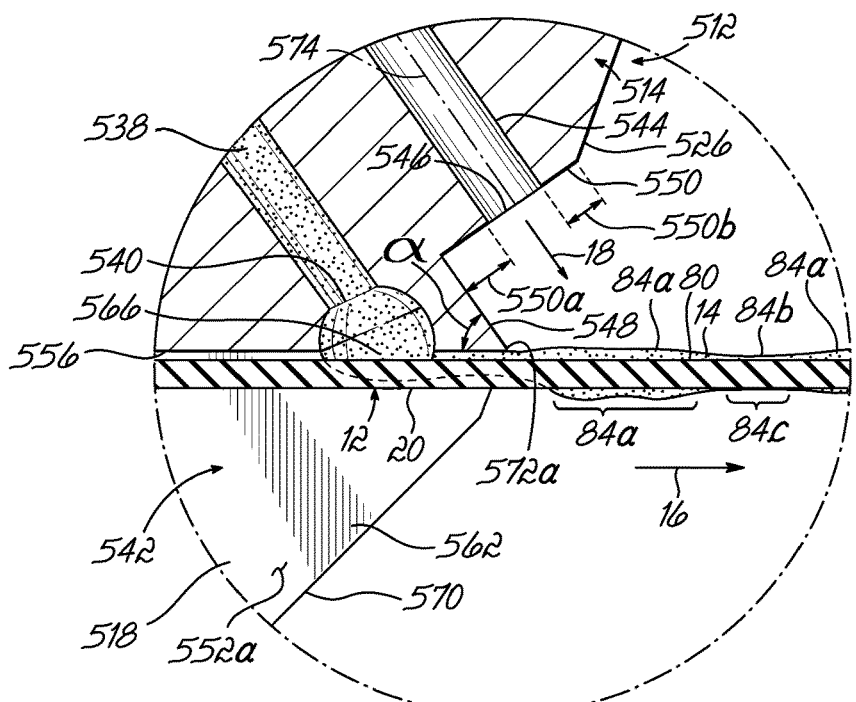
FIG. 15D is a detailed side cross-sectional view of the V-notch nozzle of FIG. 15C, further illustrating the adhesive release edge of the V-notch nozzle.

With reference to FIGS. 15C and 15D, the elastic strand 12 and adhesive 14 are shown during operation of the nozzle 512. As described briefly above, the adhesive 14 is discharged from the adhesive passage 538 through the adhesive orifice 540 and into the expansion chamber 566 adjacent the top edge 556 of the V-notch 542. The expansion chamber 566 is substantially filled with adhesive 14 such that the adhesive 14 flows out of the expansion chamber 566 and into contact with the elastic strand 12 passing the expansion chamber 566. More specifically, the adhesive 14 is applied to an upper surface 80 of the elastic strand 12 at the expansion chamber 566, and the strand 12 effectively divides at least a portion of the adhesive 14 flowing out of the expansion chamber 566 to force the adhesive 14 to move along the converging surfaces 552a, 552b of the V-notch 542 and begin spreading around the strand 12. The exemplary sharp dimensioning of the top edge 556 described in detail above ensures that the strand 12 remains generally centered relative to the expansion chamber 566, thereby ensuring the division and spreading of the adhesive 14 flowing out of the expansion chamber 566. Because the elastic strand 12 passes the expansion chamber 566 at a greater velocity than the adhesive 14 is supplied to the expansion chamber 566, the strand 12 effectively draws the adhesive 14 from the expansion chamber 566 in a semi-starved state and the adhesive 14 does not have any opportunity to fly off the elastic strand 12. Immediately after exiting the expansion chamber 566, the adhesive 14 along the upper surface 80 of the elastic strand 12 is moved mechanically by squeezing the adhesive 14 between the converging surfaces 552a, 552b of the V-notch 542 downstream of the expansion chamber 566. This mechanical movement causes spreading or wiping of the adhesive 14 around the periphery 20 of the strand 12 (see, for example, FIG. 14C) as the strand 12 moves to the outlet end 562 of the V-notch 542. The amount of initial spreading or wiping of the adhesive 14 around the periphery 20 may be adjusted by adjusting the notch angle β within the desired range of about 60 degrees to about 90 degrees. Consequently, when the elastic strand 12 reaches the outlet end 562 of the V-notch 542, the adhesive 14 is already beginning to spread and move around the periphery 20 of the strand 12.

As shown in FIG. 15D (and also in FIG. 14C), the rear surface 548 of the nozzle body 514 also intersects a lower rear surface 570 at an elongate edge 572. The outlet end 562 of the V-notch 542 intersects this lower rear surface 570 such that the top edge 556 intersects the elongate edge 572 at an adhesive release edge 572a. The top edge 556 and the rear surface 548 define an interior angle α at the adhesive release edge 572a. The interior angle α is an acute angle so that the adhesive release edge 572a promotes sharp release of the adhesive 14 on the strand 12 from the nozzle body 514. The interior angle α is measured in an upstream direction along the machine direction from the adhesive release edge 572a. To this end, the interior angle α is defined by the nozzle body 514 at the adhesive release edge 572a. In the illustrated embodiment, the acute angle from the machine direction may be in the range of about 50 degrees to about 80 degrees. As the acute angle α is made smaller within this range, the air flow from the air orifice 546 becomes more parallel to the movement of the strand 12 along the machine direction, which enables higher air pressures to be used for the air flow to further spread the adhesive 14 without blowing the adhesive 14 off of the strand 12. The adhesive release edge 572a therefore applies a similar wiping or spreading effect on the adhesive 14 as the converging surfaces 552a, 552b of the V-notch 542. Similarly, the acute angle α is also defined between the mounting surface at the top side 520 of the nozzle body 514 and a longitudinal axis 574 defined through the air orifice 546 and through at least a portion of the air passage 544, as shown in FIG. 15A.

The air discharged from the air orifice 546 along the rear surface 548 as shown by arrows 18 also assists with release of adhesive 14 from the nozzle body 514 at the adhesive release edge 572a. The air traveling along the rear surface 548 strikes the upper surface 80 of the strand 12 at a non-perpendicular angle such that the formation of any eddy currents around the adhesive release edge 572a is believed to be discouraged. More specifically, the air strikes the upper surface 80 of the strand 12 at the acute angle α described above. Therefore, the adhesive 14 remains attached to the moving strand 12 downstream of the adhesive release edge 572a rather than building up on the nozzle body 514. As a result, the risk of adhesive 14 building up on the nozzle body 30, becoming charred, and blocking the air orifice 546 is substantially reduced or eliminated. The air discharged from the air orifice 546 also continues to spread the adhesive 14 around the periphery 20 of the strand 12 to thereby form varying thicknesses of adhesive 14 along the length of the strand 12, as described in further detail below.

Upon release from the nozzle body 514, the adhesive 14 in contact with the strand 12 is struck by additional air discharged from the air orifice 546 toward the elastic strand 12. The air causes the adhesive 14, which is only partially spread around the periphery 20 of the strand 12, to spread more around the periphery 20 of the strand 12 in order to coat the strand 12 with the adhesive 14. It is believed that the mechanical movement of the adhesive 14 with the converging surfaces 552a, 552b immediately before this impact of the air further enhances the spreading effects caused by the air. The air discharged from the air orifice 546 does not blow the adhesive 14 off of the strand 12 because the adhesive 14 is applied to the strand 12 and begins forming an adhesive bond with the strand 12 within the V-notch 542 prior to being struck with the air. As a result, the adhesive 14 coats substantially the entire periphery 20 of the strand 12 as explained below.

The adhesive 14 forms a coating on the strand 12 that appears continuous to the naked eye, but it is believed that this coating is not entirely continuous along the length of the strand 12. As described above, the adhesive 14 is extruded from the adhesive orifice 540 into the expansion chamber 566 and then onto the strand 12. Consequently, the adhesive 14 contacts the moving strand 12 and rapidly accelerates, which causes the adhesive 14 to be applied to the strand 12 in a semi-starved state such that the amount of adhesive 14 varies along the length of the strand 12. More particularly, the adhesive 14 is believed to form localized masses or thicker sections separated by thinner sections as the adhesive 14 is accelerated by the elastic strand 12. These localized masses of adhesive 14 are configured to become discrete bond points when securing the elastic strand 12 to nonwoven substrates. Then the adhesive 14 is struck with air from the air orifice 546, which causes additional spreading of the adhesive 14 that tends to further spread the adhesive 14 into localized masses.

As a result of these operational steps, the resultant coating formed on the strand 12 is believed to include thickness irregularities along the length of the strand 12. In this regard, FIGS. 15C and 15D schematically illustrate that the adhesive 14 forms a coating with a plurality of thicker portions 84a, a plurality of thinner portions 84b, and preferably a plurality of void portions 84c where no adhesive 14 is on the strand 12. These portions 84a, 84b, 84c are shown as an artist's rendering and it will be appreciated that the actual appearance and distribution of these portions 84a, 84b, 84c may vary in actual use depending on operation parameters such as air pressure. The repeatable continuous appearance to the naked eye of the adhesive 14 on the strand 12 is desirable in hygiene products, but the thickness irregularities of the coating believed to be formed by the adhesive 14 advantageously results in the thicker portions 84a functioning as discrete bond points formed along the length of the strand 12 when adhered to one or more of the substrates 24a, 24b, as described in detail above. More specifically, when bonded between two nonwoven substrates 24a, 24b, the coated elastic strand 12 is coated with sufficient adhesive 14 to exhibit a high level of creep resistance and, by virtue of the discrete bond point effect, also exhibits a high level of force retraction.

Consequently, the adhesive dispensing system 510 of this embodiment operates in a general manner similarly as the nozzles 19, 110, 312, 412 previously described. More specifically, the adhesive dispensing system 510 applies adhesive 14 by contact coating the adhesive 14 onto a moving elastic strand 12 and then spreads the adhesive 14 using air flow after the adhesive 14 is in contact with the strand 12. The adhesive dispensing system 510 can advantageously coat a strand 12 with adhesive 14 with low adhesive 14 consumption and a low adhesive viscosity, if desired. It will be understood that the adhesive dispensing system 510 of this embodiment is operable to coat stretched elastic strands 12 moving faster and spaced closer than with conventional non-contact nozzle designs because the adhesive 14 is placed into direct contact with the strands 12 and because the pressurized air flow does not require significant spacing to avoid air flow interference from one strand 12 to another strand 12. Therefore, the adhesive dispensing system 510 improves the hygiene product assembly process.

The present invention also includes a method of contact coating a stretched elastic strand with an adhesive, where the strand includes a periphery with an upper surface. The method includes moving the strand in a machine direction relative to a contact nozzle, discharging the adhesive from the contact nozzle onto the upper surface of the strand as the strand moves, and discharging pressurized air at the adhesive on the moving strand. The air causes the adhesive to spread around the periphery of the strand to thereby coat the strand with the adhesive. The air also assists with release of the adhesive from the contact nozzle and cleans the contact nozzle from collecting adhesive build-up that would eventually char and adversely affect the operation of the contact nozzle. Thus, the method of coating the strand enables coating of a strand without the need to produce a spiraling pattern or other pattern with process air impacting a dispensed adhesive filament during flight.

The discharge of the air is controlled to have various air flow characteristics depending on the type of coating desired on the strand. In one example, the air is discharged continuously at the adhesive in contact with the strand as the strand moves to cause generally continuous spreading of the adhesive around the strand. In another example, the air is discharged in a non-continuous manner such as in periodic pulses at the adhesive in contact with the strand as the strand moves to cause a non-continuous (e.g., pulsed) spreading of the adhesive around the strand. The air is discharged at an acute angle relative to the machine direction as measured between the direction of air discharge and the elastic strand upstream of the air. This acute angle may also be measured between a longitudinal axis through an adhesive orifice and a mounting surface of the contact nozzle, the mounting surface configured to be coupled to a module and including an adhesive inlet for receiving the adhesive from the module. In the illustrated embodiment, the acute angle from the machine direction may be in the range of about 50 degrees to about 80 degrees, which is believed to discourage the formation of any eddy currents in the air that could cause the adhesive to blow off the strand.

In one alternative, multiple streams of air are discharged toward the adhesive on the strand to cause the adhesive to spread around opposite sides of the periphery of the strand. The multiple streams of air are staggered in the machine direction such that the multiple streams of air strike the strand at different locations along the machine direction. Alternatively, the multiple streams of air are aligned in a plane perpendicular to the machine direction such that the multiple streams of air strike the strand at about the same location along the machine direction. It will be understood that each of the multiple streams of air in these embodiments continues to be discharged at an acute angle from the machine direction.

In some embodiments, moving the strand includes moving the strand through a strand guide and through an elongate adhesive chamber. In these embodiments, dispensing the adhesive onto the upper surface of the strand further includes filling the adhesive chamber of the contact nozzle with the adhesive as the strand moves through the adhesive chamber. The strand is positioned within the adhesive chamber to force initial spreading of the adhesive around the periphery of the strand within the adhesive chamber. Furthermore, the movement of the strand draws the adhesive out of the adhesive chamber. The strand is moved at a velocity greater than the velocity at which the adhesive enters the adhesive chamber so that a minimum amount of adhesive is applied to the strand. In some arrangements, the strand is angled with respect to the adhesive chamber or the adhesive chamber is tapered such that the adhesive is located in the adhesive chamber for a longer period of time, thereby causing increased spreading of adhesive around the strand. In these arrangements, the strand is effectively moved laterally within the adhesive chamber as the strand travels along the length of the adhesive chamber, which further encourages the increased spreading of adhesive around the strand. In other embodiments, the adhesive is dispensed onto the upper surface of the strand from an adhesive orifice communicating with a V-notch through which the strand is moving. In these embodiments, the surfaces defining the V-notch mechanically move the adhesive and begin spreading the adhesive around the periphery of the strand. As a result of the spreading of the adhesive both within the adhesive chamber or V-notch and caused by air flow directed at an acute angle to the elastic strand (e.g., angled at about 50 degrees to about 80 degrees) outside the adhesive chamber or V-notch, the coating of adhesive on the strand is believed to include random thickness irregularities that function as discrete bond points formed along the length of the strand.

In one example, the method of coating a strand is used during an assembly process for a hygiene product. In these embodiments, the method further includes bonding the stretched elastic strand between two nonwoven substrate layers after the hot melt adhesive has been spread around the periphery of the strand to form at least a portion of the hygiene product. Depending on the needs of the user, the hot melt adhesive is spread using an air flow in a continuous manner or a pulsed manner. The method therefore advantageously coats a strand with adhesive with low adhesive consumption and a low adhesive viscosity. As a result, the method of the present invention improves the hygiene product assembly process.

In another example, the method of coating a strand is used to coat multiple stretched elastic strands simultaneously. To this end, the contact nozzle may include duplicated structure that enables the discharge of adhesive and pressurized air onto each of a plurality of strands. The coated elastic strands may then be used to assemble one or more hygiene products. It will be understood that the method according to any of the embodiments described above may be used to coat multiple strands.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. For example, the slots shown in the nozzle bodies of the various embodiments may be modified in shape, size, and configuration without departing from the scope of the current invention. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A contact nozzle for simultaneously coating a plurality of elastic strands moving in a machine direction with an adhesive, the contact nozzle comprising:

a single fluid inlet for receiving the adhesive from a fluid module;

a first inverted V-shaped notch extending along the contact nozzle in the machine direction, the first inverted V-shaped notch having an open bottom end and a closed top end, the closed top end being circular for receiving a first elastic strand;

a first adhesive passage formed in the contact nozzle and terminating at a first adhesive orifice at the closed top end of the first inverted V-shaped notch, the first adhesive passage being in fluid communication with the single fluid inlet for receiving the adhesive, and the first adhesive orifice directing the adhesive into contact with an upper surface of the first elastic strand;

a second inverted V-shaped notch extending along the contact nozzle in the machine direction, the second inverted V-shaped notch being adjacent the first inverted V-shaped notch in a direction perpendicular to the machine direction, the second inverted V-shaped notch having an open bottom end and a closed top end, the closed top end being circular for receiving a second elastic strand;

a second adhesive passage formed in the contact nozzle and terminating at a second adhesive orifice at the closed top end of the second inverted V-shaped notch, the second adhesive passage being in fluid communication with the single fluid inlet for receiving the adhesive, and the second adhesive orifice directing the adhesive into contact with an upper surface of the second elastic strand;

a third inverted V-shaped notch extending along the contact nozzle in the machine direction, the third inverted V-shaped notch being adjacent the second inverted V-shaped notch in the direction perpendicular to the machine direction, the third inverted V-shaped notch having an open bottom end and a closed top end, the closed top end being circular for receiving a third elastic strand;

a third adhesive passage formed in the contact nozzle and terminating at a third adhesive orifice at the closed top end of the third inverted V-shaped notch, the third adhesive passage being in fluid communication with the single fluid inlet for receiving the adhesive, and the third adhesive orifice directing the adhesive into contact with an upper surface of the third elastic strand; and a mounting surface configured to abut the fluid module when the contact nozzle is coupled to the fluid module.

2. The contact nozzle of claim 1, wherein the contact nozzle is formed by stacked plates.

3. The contact nozzle of claim 1, wherein:

the circular closed top end of the first inverted V-shaped notch defines being a first expansion chamber;

the circular closed top end of the second inverted V-shaped notch defines being a second expansion chamber; and the circular closed top end of the third inverted V-shaped notch defines being a third expansion chamber.

4. The contact nozzle of claim 1, wherein the mounting surface includes the single fluid inlet for receiving the adhesive from the fluid module.

5. The contact nozzle of claim 1, wherein:

the first adhesive orifice directs the adhesive into contact with the upper surface of the first elastic strand such that the adhesive defines thickness irregularities along the first elastic strand, the thickness irregularities including thicker adhesive portions and thinner adhesive portions along the first elastic strand;

the second adhesive orifice directs the adhesive into contact with the upper surface of the second elastic strand such that the adhesive defines thickness irregularities along the second elastic strand, the thickness irregularities including thicker adhesive portions and thinner adhesive portions along the second elastic strand; and the third adhesive orifice directs the adhesive into contact with the upper surface of the third elastic strand such that the adhesive defines thickness irregularities along the third elastic strand, the thickness irregularities including thicker adhesive portions and thinner adhesive portions along the third elastic strand.

6. The contact nozzle of claim 5, wherein the thickness irregularities along the first, second, and third elastic strands include void portions that contain no adhesive.

7. The contact nozzle of claim 1, wherein:
the first inverted V-shaped notch includes first and second converging surfaces connected at the closed top end and defining an angle between the first and second converging surfaces between 60 degrees and 90 degrees;
the second inverted V-shaped notch includes first and second converging surfaces connected at the closed top end and defining an angle between the first and second converging surfaces between 60 degrees and 90 degrees; and
the third inverted V-shaped notch includes first and second converging surfaces connected at the closed top end and defining an angle between the first and second converging surfaces between 60 degrees and 90 degrees.

8. The contact nozzle of claim 1, wherein the open bottom ends of the first inverted V-shaped notch, the second inverted V-shaped notch, and the third inverted V-shaped notch define gaps in a bottom surface of the contact nozzle.

9. The contact nozzle of claim 1, further comprising:
a single air inlet for receiving process air;
a first air passage formed in the contact nozzle and terminating at a first air orifice positioned proximate the first adhesive orifice, the first air passage being in fluid communication with the single air inlet, the first air orifice being configured to discharge the process air at the adhesive in contact with the first elastic strand to cause the adhesive to spread around the periphery of the first elastic strand;
a second air passage formed in the contact nozzle and terminating at a second air orifice positioned proximate the second adhesive orifice, the second air passage being in fluid communication with the single air inlet, the second air orifice being configured to discharge the process air at the adhesive in contact with the second elastic strand to cause the adhesive to spread around the periphery of the second elastic strand; and
a third air passage formed in the contact nozzle and terminating at a third air orifice positioned proximate the third adhesive orifice, the third air passage being in fluid communication with the single air inlet, the third air orifice being configured to discharge the process air at the adhesive in contact with the third elastic strand to cause the adhesive to spread around the periphery of the third elastic strand.

10. The contact nozzle of claim 9, wherein:
the process air discharged from the first air orifice impacts the adhesive on the first elastic strand at an acute angle relative to the machine direction;
the process air discharged from the second air orifice impacts the adhesive on the second elastic strand at an acute angle relative to the machine direction; and
the process air discharged from the third air orifice impacts the adhesive on the third elastic strand at an acute angle relative to the machine direction.

11. The contact nozzle of claim 10, further comprising:
a fourth air passage formed in the contact nozzle and terminating at a fourth air orifice positioned proximate the first adhesive orifice, the fourth air passage being in fluid communication with the single air inlet, the fourth air orifice being configured to discharge the process air at the adhesive in contact with the first elastic strand to cause the adhesive to spread around the periphery of the first elastic strand;
a fifth air passage formed in the contact nozzle and terminating at a fifth air orifice positioned proximate the second adhesive orifice, the fifth air passage being in fluid communication with the single air inlet, the fifth air orifice being configured to discharge the process air at the adhesive in contact with the second elastic strand to cause the adhesive to spread around the periphery of the second elastic strand; and
a sixth air passage formed in the contact nozzle and terminating at a sixth air orifice positioned proximate the third adhesive orifice, the sixth air passage being in fluid communication with the single air inlet, the sixth air orifice being configured to discharge the process air at the adhesive in contact with the third elastic strand to cause the adhesive to spread around the periphery of the third elastic strand.

12. The contact nozzle of claim 11, wherein:
the first and fourth air passages are angled from each other so as to be directed at opposite sides of the periphery of the first elastic strand;
the second and fifth air passages are angled from each other so as to be directed at opposite sides of the periphery of the second elastic strand; and
the third and sixth air passages are angled from each other so as to be directed at opposite sides of the periphery of the third elastic strand.

13. The contact nozzle of claim 11, wherein:
the first and fourth air passages are aligned in a plane perpendicular to the machine direction such that the process air from each of the first and fourth air passages strikes the first elastic strand at the same location along the machine direction;
the second and fifth air passages are aligned in a plane perpendicular to the machine direction such that the process air from each of the second and fifth air passages strikes the second elastic strand at the same location along the machine direction; and
the third and sixth air passages are aligned in a plane perpendicular to the machine direction such that the process air from each of said third and sixth air passages strikes the third elastic strand at the same location along the machine direction.

14. The contact nozzle of claim 9, wherein:
the first air orifice is positioned downstream from the first adhesive orifice in the machine direction;
the second air orifice is positioned downstream from the second adhesive orifice in the machine direction; and
the third air orifice is positioned downstream from the third adhesive orifice in the machine direction.

15. The contact nozzle of claim 14, wherein:
the process air is discharged from the first air orifice at an acute angle relative to the machine direction as measured between the direction of air discharge and the first elastic strand;
the process air is discharged from the second air orifice at an acute angle relative to the machine direction as measured between the direction of air discharge and the second elastic strand; and
the process air is discharged from the third air orifice at an acute angle relative to the machine direction as measured between the direction of air discharge and the third elastic strand.

16. The contact nozzle of claim 1, wherein the first inverted V-shaped notch, the second inverted V-shaped notch, and the third inverted V-shaped notch terminate in the machine direction at angled lower surface of the contact nozzle.

17. The contact nozzle of claim 16, wherein the angled lower surface of the contact nozzle has an elongate edge that intersects with the circular closed top end of the first inverted V-shaped notch, the second inverted V-shaped notch, and the third inverted V-shaped notch.

18. The contact nozzle of claim 1, wherein the contact nozzle is made of steel.

19. An adhesive dispensing system for coating a plurality of elastic strands moving in a machine direction with an adhesive, the adhesive dispensing system comprising:
a fluid module configured to receive a supply of the adhesive; and
the contact nozzle of claim 1 coupled to the fluid module.

20. The adhesive dispensing system of claim 19, further comprising a seal between the contact nozzle and fluid module.

* * * * *